United States Patent
Imamura et al.

(10) Patent No.: US 8,523,736 B2
(45) Date of Patent: Sep. 3, 2013

(54) CONTROL APPARATUS FOR VEHICULAR POWER TRANSMITTING SYSTEM

(75) Inventors: Tatsuya Imamura, Okazaki (JP); Yuji Iwase, Mishima (JP); Atsushi Tabata, Okazaki (JP); Kenta Kumazaki, Toyota (JP); Tooru Matsubara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/554,677

(22) Filed: Jul. 20, 2012

(65) Prior Publication Data

US 2012/0283065 A1 Nov. 8, 2012

Related U.S. Application Data

(62) Division of application No. 12/320,973, filed on Feb. 10, 2009.

(30) Foreign Application Priority Data

Mar. 7, 2008 (JP) ................................ 2008-058385

(51) Int. Cl.
*B60W 10/115* (2012.01)
*B60W 20/00* (2006.01)

(52) U.S. Cl.
USPC ................................ 477/3; 477/35; 903/919

(58) Field of Classification Search
USPC ........... 477/2, 3, 5, 61, 35; 180/65.21, 65.22, 180/65.275, 65.285; 701/60; 903/917, 918, 903/919

See application file for complete search history.

(56) References Cited

U.S. PATENT DOCUMENTS

| | | | |
|---|---|---|---|
| 3,671,831 A | 6/1972 | Chausse et al. | |
| 3,743,889 A | 7/1973 | Lopez-Batiz | |
| 4,411,174 A * | 10/1983 | Yokoi et al. | 477/62 |
| 4,690,017 A | 9/1987 | Taniguchi et al. | |
| 4,870,581 A | 9/1989 | Ito et al. | |
| 5,069,084 A | 12/1991 | Matsuno et al. | |
| 5,345,843 A | 9/1994 | Fujita et al. | |
| 5,347,885 A * | 9/1994 | Taga et al. | 477/65 |

(Continued)

FOREIGN PATENT DOCUMENTS

| | | |
|---|---|---|
| JP | A-05-272623 | 10/1993 |
| JP | A-2005-319924 | 11/2005 |

OTHER PUBLICATIONS

May 8, 2012 Office Action issued in Japanese Patent Application No. 2008-058385 (with partial translation).
Oct. 19, 2012 Office Action issued in U.S. Appl. No. 12/320,973.

(Continued)

*Primary Examiner* — Frank Vanaman
(74) *Attorney, Agent, or Firm* — Oliff & Berridge, PLC

(57) ABSTRACT

A control apparatus for a vehicular power transmitting system includes a shifting-point changing portion configured to change a shifting point at which a determination to perform a shifting action of a transmission portion is made, such that a shifting point is changed according to a shifting response of the transmission portion. Alternatively, the control apparatus includes a shift-control start-point changing portion configured to change a shift-control start point at which the determination to perform the shifting action is made, such that the shift-control start point is changed according to the shifting response of the transmission portion, and a compulsory shift-control starting portion configured to make the determination when an operating point of a differential portion electric motor has reached the shift-control start point.

13 Claims, 16 Drawing Sheets

(56) References Cited

U.S. PATENT DOCUMENTS

| | | | |
|---|---|---|---|
| 6,262,556 | B1 | 7/2001 | Hubbard et al. |
| 7,223,200 | B2 * | 5/2007 | Kojima et al. ............ 477/3 |
| 2004/0192494 | A1 * | 9/2004 | Ozeki et al. ............ 477/3 |
| 2005/0272555 | A1 | 12/2005 | Tabata et al. |
| 2007/0155584 | A1 | 7/2007 | Tabata et al. |

OTHER PUBLICATIONS

Apr. 16, 2013 Office Action issued in U.S. Appl. No. 12/320,973.

Jun. 28, 2013 Notice of Allowance issued in U.S. Appl. No. 12/320,973.

* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 |  |
| N |  |  |  |  |  |  |  |  |  |

○ ENGAGED
◎ ENGAGED FOR STEP-VARIABLE SHIFTING, AND RELEASED FOR CONTINUOUSLY-VARIABLE SHIFTING

CONTROL APPARATUS FOR VEHICULAR POWER TRANSMITTING SYSTEM

This is a divisional of application Ser. No. 12/320,973 filed Feb. 10, 2009 which claims priority from Japanese Application No, 2008-058385 filed on Mar. 7, 2008, the disclosure of which are herein incorporated by reference in their entirety.

BACKGROUND OF THE INVENTION

1. Field of the Invention

The present invention relates in general to a control apparatus for a vehicular power transmitting system including a transmission portion, and more particularly to techniques for improving a shifting action of the transmission portion as felt by an operator of a vehicle.

2. Discussion of Prior Art

There is known a vehicular power transmitting system including (a) a differential mechanism configured to distribute an output of an engine to a first electric motor and a power transmitting member, (b) a second electric motor connected to a power transmitting path between the power transmitting member and drive wheels of a vehicle, and (c) a an automatic transmission portion which constitutes a part of the power transmitting path. JP-2005-319924 A discloses an example of such a vehicular power transmitting system. The automatic transmission portion of this vehicular power transmitting system is provided with a plurality of hydraulically operated coupling elements, and a control apparatus for the vehicular power transmitting system is arranged to selectively release and engage the coupling elements according to a predetermined shifting boundary line map, for implementing a shifting action of the automatic transmission portion. Usually, the control apparatus stores information indicative of an operable zone of the first electric motor, which is obtained by experimentation while taking account of thermal durability and mechanical durability of the first electric motor. This operable zone is not disclosed in the above-identified publication. The periphery of the operable zone is defined by an operable limit. The control apparatus controls the first electric motor to be operated within the operable zone such that there exists a given amount of margin with respect to the operable limit.

The hydraulically operated coupling elements of the automatic transmission portion are operated with a certain time delay with respect to a moment of generation of a control signal generated from the control apparatus for the vehicular power transmitting system. The amount of the operational time delay of the coupling elements varies as a function of a temperature of a working oil or fluid used for operating the coupling elements. For example, the coupling elements have a larger amount of the operational time delay, when the working fluid temperature is extremely low, than when the working fluid temperature is held at a steady-state value after a warm-up operation of the automatic transmission portion. Accordingly, a shifting response of the automatic transmission portion is reduced (deteriorated) as the working fluid temperature is lowered. Although the first electric motor is operated within the operable zone with a given amount of margin with respect to the above-indicated operable limit while the working fluid temperature has a steady-state value, there is a possibility that an operating point of the first electric motor reaches the operable limit during a time period from the moment of generation of the control signal to initiate a shifting action of the automatic transmission portion to the moment of completion of the shifting action, and the output of the first electric motor is limited by the operable limit, when the shifting response of the automatic transmission portion is low, namely, when the coupling elements have a relatively large amount of the operational time delay with respect to the moment of generation of the control signal. This possibility is not addressed in the prior art. The output limitation of the first electric motor influences a drive force transmitted to the drive wheels, whereby the shifting action of the automatic transmission portion as felt by the vehicle operator is deteriorated. However, the control apparatus for the vehicular power transmitting system disclosed in the above-identified publication is not configured to provide any remedy for reducing or minimizing the deterioration of the shifting action of the automatic transmission portion as felt by the vehicle operator when the shifting response is low.

SUMMARY OF THE INVENTION

The present invention was made in view of the background art described above. It is therefore an object of this invention to provide a control apparatus for a vehicular power transmitting system including a transmission portion, which control apparatus is configured to reduce the deterioration of a shifting action of the transmission portion as felt by the vehicle operator when the shifting response of the transmission portion is low.

The object indicated above can be achieved according to any one of the following modes of this invention.

(1) A an electrically controlled differential portion having a differential mechanism disposed between an engine and a drive wheel of a vehicle, and a differential-portion electric motor operatively connected to the differential mechanism such that a differential state of the differential mechanism is controllable by controlling an operating state of the differential-portion electric motor, and (b) a transmission portion constituting a part of a power transmitting path, the control apparatus comprising a shifting-point changing portion configured to change a shifting point at which a determination to perform a shifting action of the transmission portion is made, such that the shifting point is changed according to a shifting response of the transmission portion.

The control apparatus constructed according to the above-described mode (1) of the present invention is configured such that the shifting point at which the determination to perform the shifting action of the transmission portion is changed according to the shifting response of the transmission portion. Accordingly, the determination as to whether the shifting action of the transmission portion should take place can be made while taking account of a possibility of a time delay of the shifting action due to a low degree of the shifting response of the transmission portion, making it possible to prevent or reduce the deterioration or reduction of the shifting action as felt by the vehicle operator due to the low shifting response of the transmission portion. The shifting point is an operating point of the vehicular power transmitting system which is represented or defined by at least one of selected quantities such as a required output torque of the transmission portion, an operating amount of an accelerator pedal of the vehicle and a running speed of the vehicle, and at which the determination as to whether the transmission portion should be shifted up or down is made. The shifting response of the transmission portion is represented by a time delay from a moment of generation of a control signal from the control apparatus to command the transmission portion to perform the shifting action, to a moment of initiation of a mechanical operation of the transmission portion to perform the shifting action in response to the control signal. The shifting response is reduced with an increase of the time delay of the shifting action.

(2) The control apparatus according to the above-described mode (1), wherein the shifting-point changing portion changes the shifting point such that a moment of the determination to perform the shifting action of the transmission portion is advanced as the shifting response is reduced.

In the above-described mode (2) of the invention wherein the shifting point is changed such that the moment of the determination to perform the shifting action of the transmission portion is advanced as the shifting response of the transmission portion is reduced, the time delay of the shifting action due to the low shifting response of the transmission portion is reduced by the advancement of the moment at which the determination to perform the shifting action is made. This mode of the invention is effective to prevent or reduce a change of an operation range of the differential-portion electric motor in the process of the shifting action of the transmission portion while the shifting response is low. Accordingly, it is possible to eliminate a need of limiting the output of the differential-portion electric motor during the shifting action of the transmission portion, for maintaining the thermal and mechanical durability of the differential-portion electric motor, so that the deterioration of the shifting action as felt by the vehicle operator due to the low shifting response can be prevented or avoided.

(3) The control apparatus according to the above-described mode (1) or (2), wherein the shifting-point changing portion increases an amount of change of the shifting point at a given value of the shifting response, with an increase of a running speed of the vehicle.

Generally, the output torque of the engine and the output torque of the differential-portion electric motor which is a reaction torque corresponding to the engine output torque increase with an increase of the running speed of the vehicle, since the running resistance of the vehicle increases with the increase of the vehicle running speed. Further, a permissible range of a change of the operating speed of the differential-portion electric motor is narrowed toward zero with an increase of the output torque of this electric motor, since there is a permissible maximum value of the output of the electric motor. Accordingly, it is considered that there is a high possibility at a relatively high value of the vehicle running speed that the output torque of the differential-portion electric motor is reduced due to the limitation of its output as a result of a large amount of change of its operating speed before the moment of completion of the shifting action of the transmission portion due to the low shifting response. In the above-described mode (3) of this invention wherein the amount of change of the shifting point at a given value of the shifting response of the transmission portion is increased with an increase of the running speed of the vehicle, the amount of change of the shifting point at the same shifting response of the automatic transmission portion is increased with an increase of the running speed, that is, with an increase of the output torque of the differential-portion electric motor. Accordingly, the possibility of the output limitation of the differential-portion electric motor can be reduced, whereby the deterioration of the shifting action as felt by the vehicle operator due to the relatively low shifting response can be effectively reduced, at different values of the vehicle speed.

(4) The control apparatus according to any one of the above-described modes (1)-(3), wherein the shifting point changed by the shifting-point changing portion is a shifting-point speed of the vehicle at which the determination to perform the shifting action of the transmission portion is made.

The operating speed of the differential-portion electric motor changes according to a change of the vehicle speed before initiation of the shifting action of the transmission portion. In the above-described mode (4) of this invention, the shifting-point speed of the vehicle at which the determination to perform the shifting action of the transmission portion is changed, namely, the speed at which the determination to perform the shifting action of the transmission portion is made is changed according to the shifting response of the transmission portion.

(5) The control apparatus according to any one of the above-described modes (1)-(4), wherein the shifting action of the transmission portion is performed by a hydraulic actuator device, and the shifting response of the transmission portion is determined on the basis of a temperature of a working fluid used to operate the hydraulic actuator device.

In the above-described mode (5) of the invention wherein the shifting action of the transmission portion is performed by the hydraulic actuator device, and the shifting response is determined on the basis of the working fluid temperature of the hydraulic actuator device, the shifting response of the transmission portion can be easily determined by detecting the working fluid temperature, since the shifting response changes with a change of the viscosity of the working fluid, which changes depending upon the temperature of the working fluid.

(6) The control apparatus according to any one of the above-described modes (1)-(5), wherein the shifting-point changing portion shifts a shift-up speed of the vehicle at which a determination to perform a shift-up action of the transmission portion is made, such that the shift-up speed decreases with a decrease of the shifting response of the transmission portion. The shift-up speed of the vehicle may be replaced by a shift-up boundary line consisting of a series of shift-up speed values of the vehicle at which the determination to perform the shift-up action is made.

(7) The control apparatus according to any one of the above-described modes (1)-(6), wherein the shifting-point changing portion shifts a shift-down speed of the vehicle at which a determination to perform a shift-down action of the transmission portion is made, such that the shift-down speed increases with a decrease of the shifting response of the transmission portion. The shift-down speed of the vehicle may be replaced by a shift-down boundary line consisting of a series of shift-down speed values of the vehicle at which the determination to perform the shift-down action is made.

(8) The control apparatus according to any one of the above-described modes (1)-(7), further comprising a shifting-action determining portion configured to determine that the shifting action of the transmission portion should take place, when an operating point indicative of an operating state of the vehicular power transmitting system has reached the shifting point.

(9) The control apparatus according to any one of the above-described modes (1)-(8), further comprising a control portion which stores data representative of an operable zone of the differential-portion electric motor obtained by experimentation while taking account of a maximum permissible output, thermal durability and mechanical durability of the differential-portion electric motor, and wherein the control portion controls the differential-portion electric motor such that an operating point of the differential-portion electric motor is operated within the operable zone and such that the operating point does not reach an operable limit which defines a periphery of the operable zone.

(10) The control apparatus according to the above-described mode (9), wherein the operating point of the differential-portion electric motor is defined by an operating speed and an output torque of the differential-portion electric motor and indicates an operating state of the differential-portion electric motor.

(11) The control apparatus according to the above-described mode (9) or (10), wherein the operable zone of the differential-portion electric motor is a range within which the operating point of the differential-portion electric motor is permitted to be moved.

(12) The control apparatus according to any one of the above-described modes (9)-(11), wherein the control portion controls a speed ratio and a differential state of the electrically controlled differential portion such that an operating point of the engine moves along a highest-fuel-economy curve determined to establish a desired operating state of the engine.

In the above-described mode (12) of the present invention, the engine is operated with the highest fuel economy by controlling the operating state (differential state) of the differential-portion electric motor. The operating point of the engine is defined by an operating speed and an output torque of the engine and represents the operating state of the engine.

(13) The control apparatus according to any one of the above-described modes (1)-(12), wherein the engine, the electrically controlled differential portion, the transmission portion and the drive wheel are disposed in this order of description in a power transmitting path between the engine and the drive wheel.

(14) The control apparatus according to any one of the above-described modes (1))-(13), wherein the shifting-point changing portion changes the shifting point such that a moment of the determination to perform the shifting action of the transmission portion is advanced as a running speed of the vehicle is increased while the shifting response of the transmission portion is lower than a steady-state value after completion of a warm-up operation of the vehicle.

(15) The control apparatus according to any one of the above-described modes (1)-(14), wherein the differential mechanism is a planetary gear set of a single-pinion type having a first rotary element in the form of a carrier connected to the engine, a second rotary element in the form of a sun gear operatively connected to the differential-portion electric motor, and a third rotary element in the form of a ring gear operatively connected to the drive wheel.

In the above-described mode (15) of this invention, the axial dimension of the differential mechanism can be reduced, and the differential mechanism consisting of a single planetary gear set is simplified in construction.

(16) A control apparatus for a vehicular power transmitting system including (a) an electrically controlled differential portion having a differential mechanism disposed between an engine and a drive wheel of a vehicle, and a differential-portion electric motor operatively connected to the differential mechanism such that a differential state of the differential mechanism is controllable by controlling an operating sate of the differential-portion electric motor, and (b) a transmission portion constituting a part of a power transmitting path, the control apparatus comprising:
  a shift-control start-point changing portion configured to change a shift-control start point at which a determination to perform a shifting action of the transmission portion is made, such that the shift-control start point is changed according to a shifting response of the transmission portion; and
  a compulsory shift-control starting portion configured to make the determination to perform the shifting action, when the shift-control start-point changing portion determines that an operating point of the differential-portion electric motor has reached the shift-control start point.

In the control apparatus according to the above-described mode (16), the shift-control start point at which the determination to perform the shifting action of the transmission portion is made is changed according to a shifting response of the transmission portion; and the determination to perform the shifting action is made when the operating point of the differential-portion electric motor has reached the shift-control start point. Thus, the shift-control start point is changed according to the shifting response of the transmission portion, so that the determination as to whether the shifting action of the transmission portion should take place can be made while taking account of a possibility of a time delay of the shifting action due to a low degree of the shifting response of the transmission portion, making it possible to prevent or reduce the deterioration or reduction of the shifting action as felt by the vehicle operator due to the low shifting response of the transmission portion.

(17) The control apparatus according to the above-described mode (16), wherein the shift-control start-point changing portion changes the shift-control start point such that a moment of the above-indicated determination to perform the shifting action of the transmission portion is advanced as the shifting response is reduced.

In the above-described mode (17) of this invention wherein the shift-control start point is changed such that the moment of the determination to perform the shifting action of the transmission portion is advanced as the shifting response of the transmission portion is reduced, the time delay of the shifting action due to the low shifting response of the transmission portion is reduced by the advancement of the moment at which the determination to perform the shifting action is made. This mode of the invention is effective to prevent or reduce a change of an operation range of the differential-portion electric motor in the process of the shifting action of the transmission portion while the shifting response is low. Accordingly, it is possible to eliminate a need of limiting the output of the differential-portion electric motor during the shifting action of the transmission portion, for maintaining the thermal and mechanical durability of the differential-portion electric motor, so that the deterioration of the shifting action as felt by the vehicle operator due to the low shifting response can be prevented or avoided.

(18) The control apparatus according to the above-described mode (16) or (17), wherein the shift-control start-point changing portion increases an amount of change of the shift-control start point at a given value of the shifting response, with an increase of a running speed of the vehicle.

In the above-described mode (18) of the invention wherein the amount of change of the shift-control start point at a given value of the shifting response of the transmission portion is increased with an increase of the running speed of the vehicle, the amount of change of the shift-control start point at the same shifting response of the automatic transmission portion is increased with an increase of the running speed, that is, with an increase of the output torque of the differential-portion electric motor. Accordingly, the possibility of the output limitation of the differential-portion electric motor can be reduced, whereby the deterioration of the shifting action as felt by the vehicle operator due to the relatively low shifting response can be effectively reduced, at different values of the vehicle speed.

(19) The control apparatus according to any one of the above-described modes (16)-(18), wherein the shifting action of the transmission portion is performed by a hydraulic actuator device, and the shifting response of the transmission portion is determined on the basis of a temperature of a working fluid used to operate the hydraulic actuator device.

The above-described mode (19) of the invention has the same advantage as descried above with respect to the above-described mode (5).

(20) The control apparatus according to any one of the above-described modes (16)-(19), wherein the shift-control start-point changing portion shifts a shift-up speed of the vehicle at which a determination to perform a shift-up action of the transmission portion is made, such that the shift-up speed decreases with a decrease of the shifting response of the transmission portion. The shift-up speed of the vehicle may be replaced by a shift-up boundary line consisting of a series of shift-up speed values of the vehicle at which the determination to perform the shift-up action.

(21) The control apparatus according to any one of the above-described modes (16)-(20), wherein the shift-control start-point changing portion shifts a shift-down speed of the vehicle at which a determination to perform a shift-down action of the transmission portion is made, such that the shift-down speed increases with a decrease of the shifting response of the transmission portion. The shift-down speed of the vehicle may be replaced by a shift-down boundary line consisting of a series of shift-down speed values of the vehicle at which the determination to perform the shift-down action.

(22) The control apparatus according to any one of the above-described modes (16)-(21), wherein the shift-control start-point changing portion changes, as the shift-control start point, an operating speed of the differential-portion electric motor at which the determination to perform the shifting action of the transmission portion is made.

(23) The control apparatus according to any one of the above-described modes (16)-(22), wherein the compulsory shift-control starting portion determines that the shifting action of the transmission portion should take place, when an operating point indicative of an operating state of the vehicular power transmitting system has reached the shift-control start point.

(24) The control apparatus according to any one of the above-described modes (16)-(23), further comprising a control portion which stores data representative of an operable zone of the differential-portion electric motor obtained by experimentation while taking account of a maximum permissible output, thermal durability and mechanical durability of the differential-portion electric motor, and wherein the control portion controls the differential-portion electric motor such that an operating point of the differential-portion electric motor is operated within the operable zone and such that the operating point does not reach an operable limit which defines a periphery of the operable zone.

(25) The control apparatus according to the above-described mode (24), wherein the operating point of the differential-portion electric motor is defined by an operating speed and an output torque of the differential-portion electric motor and indicates an operating state of the differential-portion electric motor.

(26) The control apparatus according to the above-described mode (24) or (25), wherein the operable zone of the differential-portion electric motor is a range within which the operating point of the differential-portion electric motor is permitted to be moved.

(27) The control apparatus according to any one of the above-described modes (24)-(26), wherein the control portion controls a speed ratio and a differential state of the electrically controlled differential portion such that an operating point of the engine moves along a highest-fuel-economy curve determined to establish a desired operating state of the engine.

The above-described mode (27) of the present invention has the same advantage as described above with respect to the above-described mode (12).

(28) The control apparatus according to any one of the above-described modes (16)-(27), wherein the engine, the electrically controlled differential portion, the transmission portion and the drive wheel are disposed in this order of description in a power transmitting path between the engine and the drive wheel.

(29) The control apparatus according to any one of the above-described modes (16)-(28), wherein the shift-control start-point changing portion changes the shift-control start point such that a moment of the determination to perform the shifting action of the transmission portion is advanced as a running speed of the vehicle is increased while the shifting response of the transmission portion is lower than a steady-state value after completion of a warm-up operation of the vehicle.

(30) The control apparatus according to any one of the above-described modes (16)-(29), wherein the differential mechanism is a planetary gear set of a single-pinion type having a first rotary element in the form of a carrier connected to the engine, a second rotary element in the form of a sun gear operatively connected to the differential-portion electric motor, and a third rotary element in the form of a ring gear operatively connected to the drive wheel.

In the above-described mode (30) of the invention, the axial dimension of the differential mechanism can be reduced, and the differential mechanism consisting of a single planetary gear set is simplified in construction.

The shifting-point changing portion provided according to the above-described mode (1) of the invention is configured to change the shifting point at which the determination to perform the shifting action of the transmission portion is made, such that the shifting point is changed according to the shifting response of the transmission portion. On the other hand, the shift-control start-point changing portion provided according to the above-described mode (16) of the invention is configured to change the shift-control start point at which the determination to perform the shifting action of the transmission portion is made, such that the shift-control start point is changed according to the shifting response of the transmission portion. In the mode (1) of the invention, a change of the shifting point according to the shifting response of the transmission portion causes a change of the operating point of the differential-portion electric motor at which the determination to perform the shifting action is made, according to the shifting response of the transmission portion. In both of the modes (1) and (16) of the invention, the operating point of the differential-portion electric motor at which the determination to perform the shifting action of the transmission portion is made is changed according to a change of the shifting response of the transmission portion. Thus, the modes (1) and (16) of the present invention are linked so as to form a single inventive concept.

BRIEF DESCRIPTION OF THE DRAWINGS

The above and other objects, features, advantages and technical and industrial significance of this invention will be better understood by reading the following detailed description of preferred embodiments of the invention, when considered in connection with the following drawings, in which.

DETAILED DESCRIPTION OF PREFERRED EMBODIMENT

Figures 1, 2:
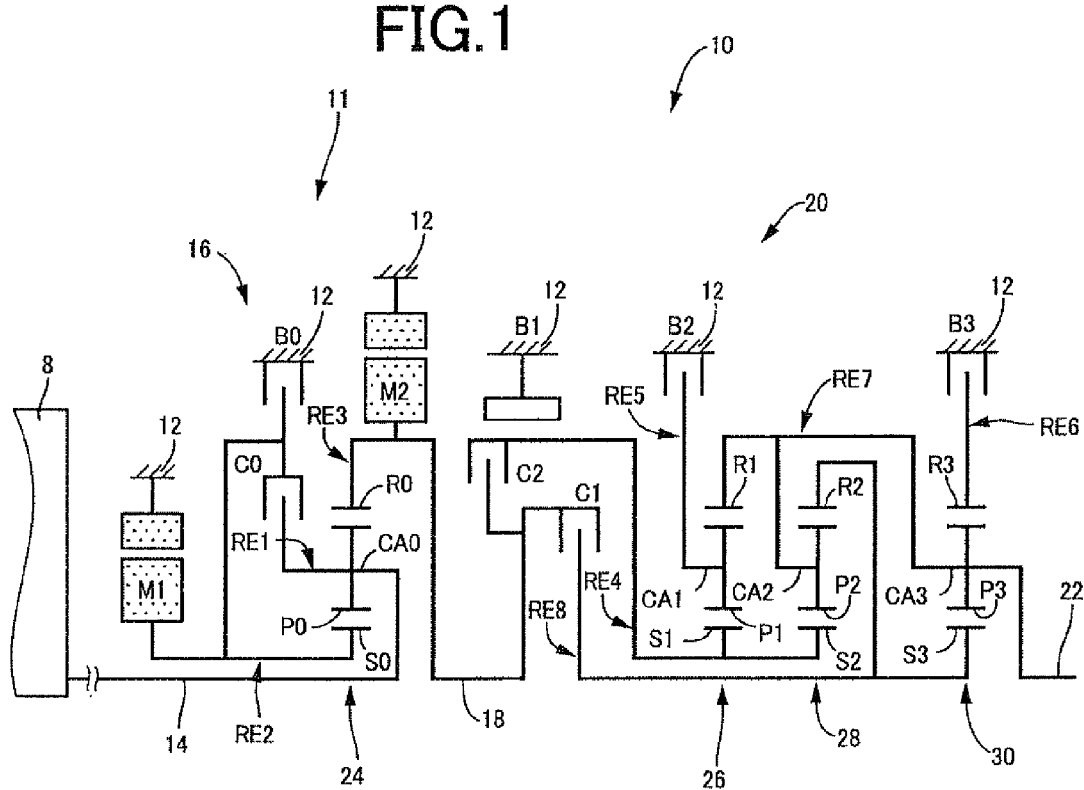
FIG. 1 is a schematic view showing an arrangement of a vehicular power transmitting system controlled by a control apparatus of the present invention.
FIG. 2 is a table indicating shifting actions of the vehicular power transmitting system shown in FIG. 1, which is operable in a selected one of a continuously-variable shifting state and a step-variable shifting state, in relation to different combinations of operating states of hydraulically operated frictional coupling devices to effect the respective shifting actions.
Figure 6:
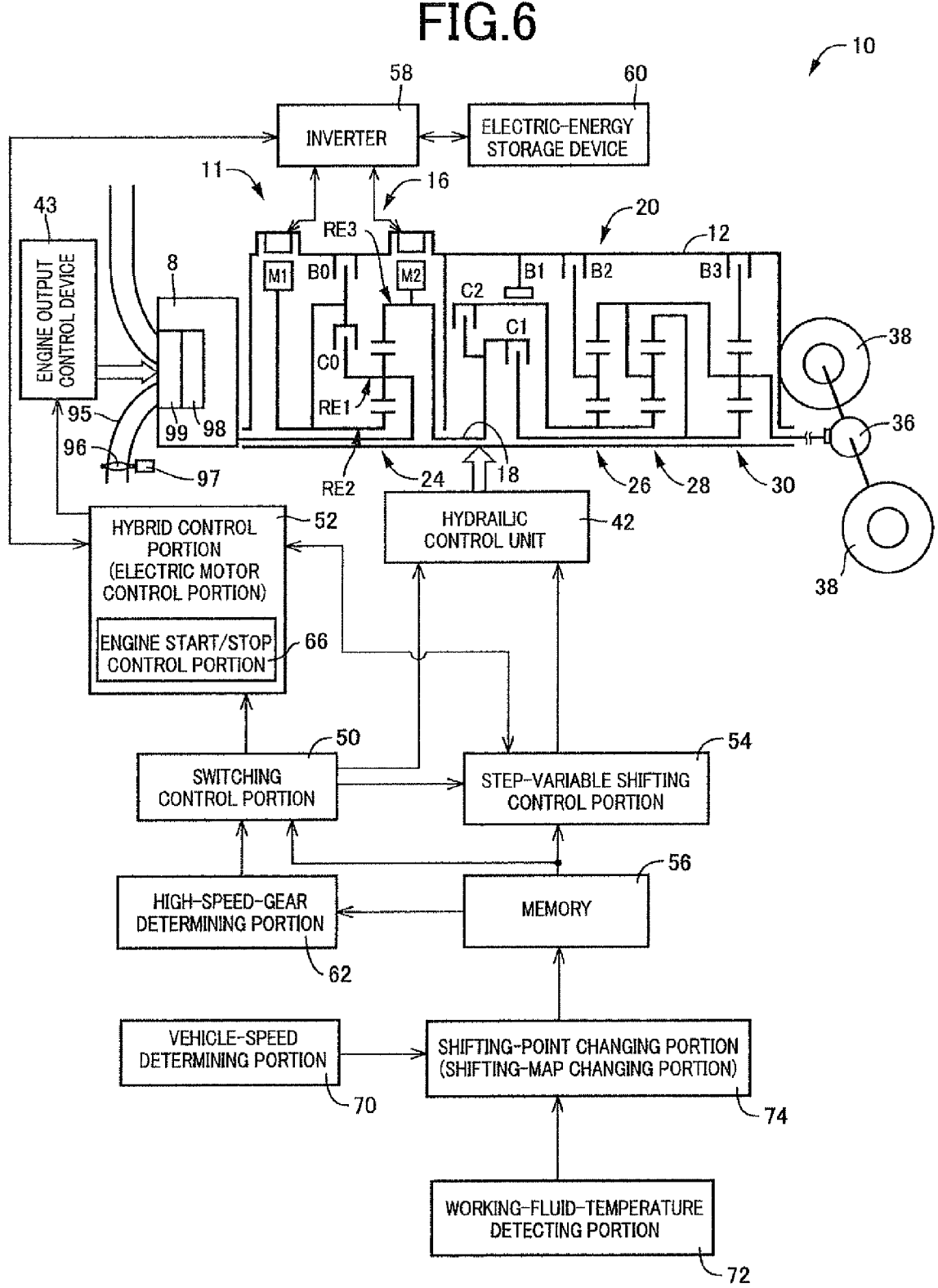
FIG. 6 is a functional block diagram illustrating major control functions of the electronic control device of FIG. 4.

Referring to the schematic view of FIG. 1, there is shown a vehicular power transmitting system 10 (hereinafter referred to as "power transmitting system 10"), which is controlled by a control apparatus according to this invention. In FIG. 1, the power transmitting system 10 includes: an input rotary member in the form of an input shaft 14; a differential portion 11 connected to the input shaft 14 either directly, or indirectly via a pulsation absorbing damper (vibration damping device) not shown; an automatic transmission portion 20 disposed between the differential portion 11 and drive wheels 38 (shown in FIG. 6) of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This power transmitting system 10 is suitably used for a longitudinal FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device (final speed reduction gear) 26 and a pair of drive axles, as shown in FIG. 6. The engine 8 may be a gasoline engine or diesel engine and functions as a vehicle drive power source directly connected to the input shaft 14 or indirectly via a pulsation absorbing damper. The differential gear device 36 constitutes a part of a power transmitting path.

In the present power transmitting system 10, the engine 8 and the differential portion 11 are connected directly to each other. This direct connection means that the engine 8 and the differential portion 11 are connected to each other, without a fluid-operated power transmitting device such as a torque converter or a fluid coupling being disposed therebetween, but may be connected to each other through the pulsation absorbing damper as described above. It is noted that a lower half of the power transmitting system 10, which is constructed symmetrically with respect to its axis, is omitted in FIG. 1.

The differential portion 11, which is operable as an electrically controlled differential portion, is provided with: a first electric motor M1; a power distributing mechanism 16 functioning as a differential mechanism operable to mechanically distribute an output of the engine 8 received by the input shaft 14, to the first electric motor M1 and the power transmitting member 18: and a second electric motor M2 which is rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16, which is a differential mechanism, includes as major components a planetary gear set 24 of a single pinion type having a gear ratio $\rho 0$ of about 0.418, for example, a switching clutch C0 and a switching brake B1. The planetary gear set 24 of the power distributing mechanism 16 has rotary elements consisting of: a sun gear S0, a planetary gear P0; a carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio $\rho 0$ is represented by $ZS0/ZR0$.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The switching brake B0 is disposed between the sun gear S0 and the casing 12, and the switching clutch C0 is disposed between the sun gear S0 and the carrier CA0. When the switching clutch C0 and brake B0 are both released, the power distributing mechanism 16 is placed in a differential state in which three elements of the first planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) is placed in a continuously-variable shifting state (electrically established CVT state), in which the differential portion 11 is operated as an electrically controlled differential device and in which the rotating speed of the power transmitting member 18 is continuously variable, irrespective of the operating speed of the engine S. Namely, when the power distributing mechanism 16 is placed in the differential state, the differential portion 11 is placed in the differential state or continuously-variable shifting state in which the differential portion 11 functions as an electrically controlled continuously variable transmission the speed ratio $\gamma 0$ (rotating speed of the input shaft 14/rotating speed of the power transmitting member 18) is continuously variable from a minimum value $\gamma 0 min$ to a maximum value $\gamma 0 max$. When the power distributing mechanism 16 is placed in the differential state, the differential state between the rotating speed of the input shaft 14 and the rotating speed of the power transmitting member 18 is controlled by controlling the operating states of the first and second electric motors M1, M2 and the engine 8 operatively connected to the power distributing mechanism 16 (differential portion 11).

When the switching clutch C0 or brake B0 is engaged while the power distributing mechanism 16 is placed in the continuously-variable shifting state, the power distributing mechanism 16 is brought into a non-differential state in which the differential function is not available. Described in detail, when the switching clutch C0 is engaged, the sun gear S0 and the carrier CA0 are connected together, so that the power distributing mechanism 16 is placed in a locked state in which the three rotary elements of the planetary gear set 24 consisting of the sun gear S0, carrier CA0 and ring gear R0 are rotatable as a unit, namely, placed in a first non-differential state in which the differential function is not available, so that the differential portion 11 is also placed in a non-differential state. In this first non-differential state, the operating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio $\gamma 0$ equal to 1. When the switching brake B0 is engaged in place of the switching clutch C0, the sun gear S0 is fixed to the casing 12, so that the power distributing mechanism 16 is placed in the locked state in which the sun gear S0 is not rotatable, namely, placed in a second non-differential state in which the differential function is not available, so that the differential portion 11 is also placed in the non-differential state. Since the rotating speed of the ring gear R0 is made higher than that of the carrier CA0, the differential portion 11 is placed in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the differential portion 11 is operable as a transmission having a single gear position with one speed ratio or a plurality of gear positions with respective speed ratios, namely, the fixed-speed-ratio shifting state in which the differential portion 11 is operated as a transmission having a single gear position with one speed ratio or a plurality of gear positions with respective speed ratios.

The automatic transmission portion 20 is a transmission portion in the form of a step-variable automatic transmission the speed ratio of which (rotating speed $N_{18}$ of the power transmitting member 18/rotating speed $N_{OUT}$ of the output shaft 20) is variable in steps. The automatic transmission portion 20 includes a single-pinion type first planetary gear set 26, a single-pinion type second planetary gear set 28 and a single-pinion type third planetary gear set 30. The second planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio $\rho 1$ of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio $\rho 2$ of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio $\rho 3$ of about 0.421. Where the numbers of teeth of the first sun gear S1, firs ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios $\rho 1$, $\rho 2$ and $\rho 3$ are represented by ZS1/ZR1. ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

The power transmitting system 10 constructed as described above is placed in a selected one of a first gear position (first speed position) through a fifth gear position (fifth speed position), a reverse gear position (rear drive position) and a neural position, by engaging actions of a corresponding combination of the two frictional coupling devices selected from the above-described switching clutch C0, first clutch C1, second clutch C2, switching brake B0, first brake B1, second brake B2 and third brake B3, as indicated in the table of FIG. 2. The above-indicated positions have respective speed ratios $\gamma$ (input shaft speed $N_{IN}$/output shaft speed $N_{OUT}$) which change as geometric series. The power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present power transmitting system 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the power transmitting system 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the power transmitting system 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is establishing by releasing all of the clutches C0, C1, C2 and brakes B0, B1, B2, B2, B3.

Where the power transmitting system 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position, namely, the rotating speed of the power transmitting member 18 is continuously changed, so that the speed ratio of the power transmitting system when the automatic transmission portion 20 is placed in the selected gear position is continuously variable over a predetermined range. Accordingly, the overall speed ratio γT of the power transmitting system 10 is continuously variable.

Figure 3:
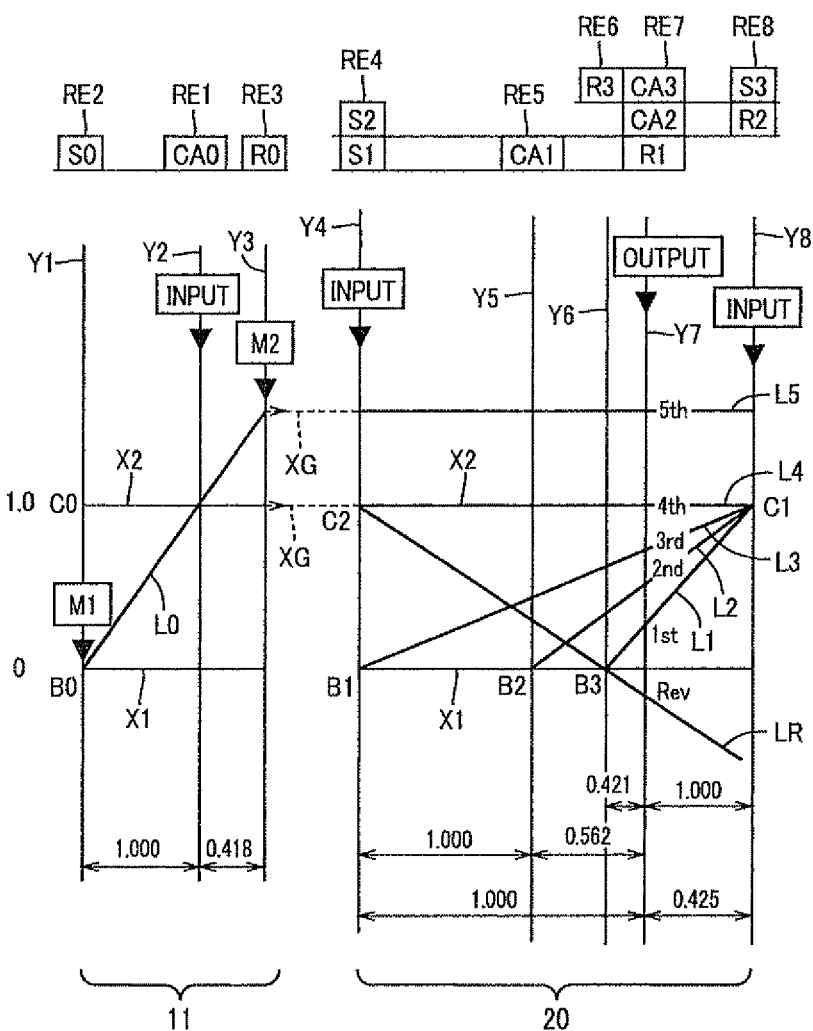
FIG. 3 is a collinear chart indicating relative rotating speeds of the vehicular power transmitting system of FIG. 1 operated in the step-variable shifting state, in different gear positions of the power transmitting system.

The collinear chart of FIG. 3 indicates, by straight lines, a relationship among the rotating speeds of the rotary elements in each of the gear positions of the power transmitting system 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the sun gear S0, a first rotary element (first element) RE1 in the form of the carrier CA0, and a third rotary element (third element) RE3 in the form of the ring gear R0. The distances between the adjacent ones of the vertical lines Y1, Y2 and Y3 are determined by the gear ratio ρ0 of the planetary gear set 24. That is, the distance between the vertical lines Y1 and Y2 corresponds to "1", while the distance between the vertical lines Y2 and Y3 corresponds to the gear ratio ρ0. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the carrier CA1, a sixth rotary element (sixth element) RE6 in the form of the third ring gear R3, a seventh rotary element (seventh element) RE7 in the form of the first ring gear R1 and second and third carriers CA2, CA3 that are integrally fixed to each other, and an eighth rotary element (eighth element) RE8 in the form of the second ring gear R2 and third sun gear S3 integrally fixed to each other. The distances between the adjacent ones of the vertical lines are determined by the gear ratios ρ1, ρ2 and ρ3 of the first, second and third planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ0. In the automatic transmission portion 20, the distance between the sun gear and carrier of each of the first, second and third planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the power transmitting system 10 is arranged such that the first rotary element RE1 (carrier CA0) of the planetary gear set 24 is integrally fixed to the input shaft 14 (engine 8) and selectively connected to the second rotary element RE2 (sun gear S0) through the switching clutch C0, and this second rotary element RE2 is fixed to the first electric motor M1 and selectively fixed to the casing 12 through the switching brake B0, while the third rotary element RE3 (ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the sun gear S0 and the ring gear R0 is represented by an inclined straight line L0 which passes a point of intersection between the lines Y2 and X2.

When the power transmitting system 10 is brought into the continuously-variable shifting state (differential state) by releasing actions of the switching clutch C0 and brake B0, for instance, the rotating speed of the sun gear S0 represented by a point of intersection between the straight line L0 and the vertical line Y1 is raised or lowered by controlling the operating speed of the first electric motor M1, so that the rotating speed of the carrier CA0 represented by the straight line L0 and the vertical line Y2 is raised or lowered, if the rotating speed of the ring gear R0 determined by the vehicle speed V and represented by a point of intersection between the straight line L0 and the vertical line Y3 is substantially held constant. When the switching clutch C0 is engaged, the sun gear S0 and the carrier CA0 are connected to each other, and the power distributing mechanism 16 is placed in the first non-differential state in which the above-indicated three rotary elements RE1, RE2, RE3 are rotated as a unit, so that the straight line L0 is aligned with the horizontal line X2, so that the power transmitting member 18 is rotated at a speed equal to the engine speed $N_E$. When the switching brake B0 is engaged, on the other hand, the sun gear S0 is fixed to the casing 12, and the power distributing mechanism 16 is placed in the second non-differential state in which the power distributing mechanism 16 functions as a speed-increasing mechanism, so that the straight line L0 is inclined in the state indicated in FIG. 3, whereby the rotating speed of the ring gear R0 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element REG and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
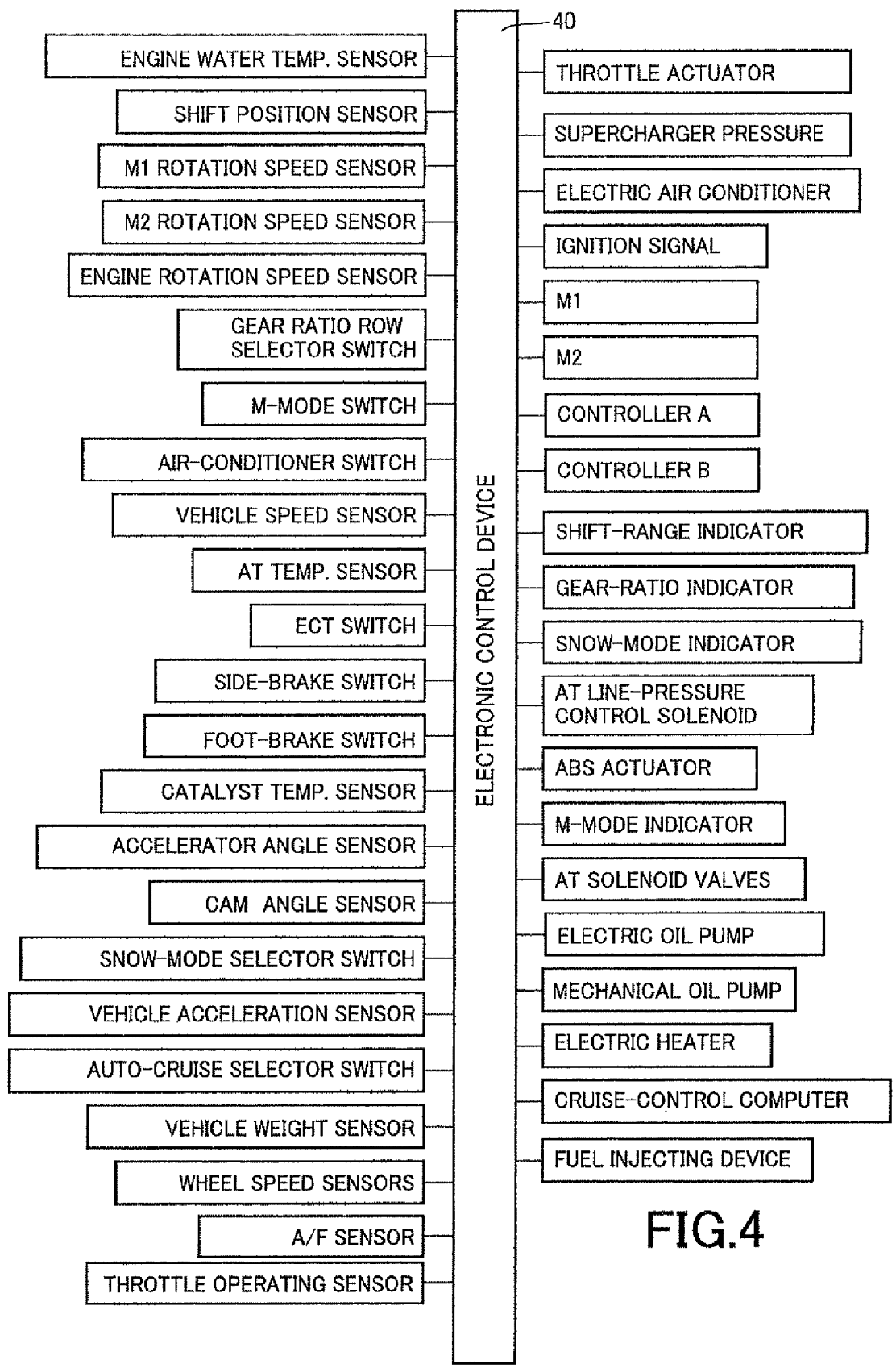
FIG. 4 is a view indicating input and output signals of an electronic control device serving as the control apparatus constructed according to one embodiment of this invention to control the power transmitting system of FIG. 1.

FIG. 4 indicates signals received by an electronic control device 40 which is provided to control the power transmitting system 10 constituting a part of the hybrid vehicle power transmitting system, and the control apparatus constructed according to the present embodiment of the invention. FIG. 4 also indicates signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever 49 (shown in FIG. 5); a signal indicative of an operating speed $N_{M1}$ of the first electric motor M1 (hereinafter referred to as "first electric motor speed $N_{M1}$"); a signal indicative of an operating speed $N_{M2}$ of the second electric motor M2 (hereinafter referred to as "second electric motor speed $N_{M2}$"); a signal indicative of the operating speed $N_E$ of the engine 8; a signal indicative of a value indicating gear ratios of a selected group of forward-drive positions of the power transmitting system 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature $TEMP_{ATF}$ of a working oil or fluid for operating and lubricating the differential portion 11 and the automatic transmission portion 20 (hereinafter referred to as "working fluid temperature $TEMP_{ATF}$"); a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; and a signal indicative of an air/fuel (A/F) ratio of an air-fuel mixture of the engine 8.

The electronic control device 40 is further arranged to generate various signals such as: control signals to be applied to an engine output control device 43 (shown in FIG. 6) to control the output of the engine 8, such as a drive signal to drive a throttle actuator 97 for controlling the opening angle $\theta_{TH}$ of an electronic throttle valve 96 disposed in an intake pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 6) provided to control the hydraulic actuators of the hydraulically operated frictional coupling devices (hydraulic actuator device) of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

Figure 5:
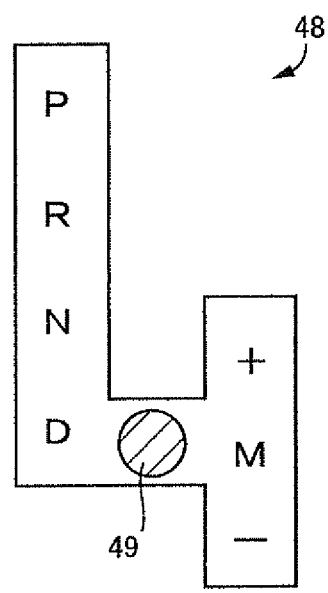
FIG. 5 is a manually operable shifting device including a shift lever having a plurality of shift positions.

FIG. 5 shows an example of a manually operable shifting device in the form of a shifting device 48. The shifting device 48 includes the above-described shift lever 49, which is disposed laterally adjacent to an operator's seat, for example, and which is manually operated to select one of the plurality of shift positions $P_{SH}$.

The shift positions SP consist of: a parking position P for placing the power transmitting system 10 (more precisely, the automatic transmission portion 20) in a neutral state in which the power transmitting path is disconnected and in which the output shaft 22 of the automatic transmission portion 20 is locked; a reverse R for driving the vehicle in the rearward direction; a neutral position N for placing the power transmitting system 10 in the neutral state; an automatic forward-drive shifting position D; and a manual forward-drive shifting position M. When the shift lever 49 is operated to the automatic forward-drive shifting position D, the power transmitting system 10 is placed in an automatic shifting mode in which the overall speed ratio γT is automatically changed. When the shift lever 49 is operated to the manual forward-drive shifting position M, the power transmitting system 10 is placed in a manual shifting mode in which the highest gear position to which the automatic transmission portion 20 is automatically shiftable can be selected.

When the shift lever 49 is operated to a selected one of the shift positions $P_{SH}$, the hydraulic control unit 42 is electrically switched to establish one of the reverse-drive position R, neutral position N and first through fifth gear positions that are indicated in the table of FIG. 2.

The above-indicated parking position P and the neutral position N of the shift lever 49 are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 49 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 49 from the neutral position N to the automatic forward-drive position D causes at least the first clutch C1 to be engaged for switching the power transmitting path in the automatic transmission portion 20 from the power-cut-off state to the power transmitting state. Further, a manual operation of the shift lever 49 from the reverse-drive position R to the parking position P or neutral position N causes the second clutch C2 to be released for switching the power transmitting path in the automatic transmission portion 20 from the power transmitting state to the power cut-off state. A manual operation of the shift lever 49 from the automatic forward-drive shifting position D to the neutral position N causes the first and second clutches C1, C2 to be released for switching the power transmitting path in the automatic transmission portion 20 from the power transmitting state to the power cut-off state.

FIG. 6 is a functional block diagram for explaining major control functions of the electronic control device 40, which includes a switching control portion 50, a hybrid control portion 52, a step-variable shifting control portion 54, a memory 56, a high-speed-gear determining portion 62, a vehicle-speed determining portion 70, a working-fluid-temperature determining portion 72, and a shifting-point changing portion 74. The step-variable shifting control portion 54 functions as a shifting control portion and a shifting-action determining portion operable to control shifting actions of the automatic transmission portion 20. For example, the step-variable shifting control portion 54 is configured to determine whether a shifting action of the automatic transmission portion 20 should take place, that is, to determine the gear position to which the automatic transmission portion 20 should be shifted. This determination is made on the basis of a condition of the vehicle in the form of the vehicle speed V and a required output torque $T_{OUT}$ of the automatic transmission portion 20, and according to a shifting boundary line map (shifting control map or relation) which is stored in the memory 56 and which represents shift-up boundary lines indicated by solid lines in FIG. 7 and shift-down boundary lines indicated by one-dot chain lines in FIG. 7. The step-variable shifting control portion 54 generates commands (shifting commands or hydraulic control command) to be applied to the hydraulic control unit 42, to selectively engage and release the respective two hydraulically operated frictional coupling devices (except the switching clutch C0 and brake B0), for establishing the determined gear position of the automatic transmission portion 20 according to the table of FIG. 2. When the shifting-point changing portion 74 has changed the shift-down or shift-up boundary lines of FIG. 7 as described below in detail, the step-variable shifting control portion 54 makes the determination as to whether a shifting action of the automatic transmission portion 20 should take place, according to the changed shift-up or shift-down boundary lines. It is noted that the required output torque $T_{OUT}$ of the automatic transmission portion 20 taken along the vertical axis of the shifting boundary line map of FIG. 7 increases with an increase of the operating amount $A_{CC}$ of the accelerator pedal, so that the required output torque $T_{OUT}$ of the map may be replaced by the accelerator pedal operating amount $A_{CC}$.

The hybrid control portion 52 is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the power transmitting system 10 is placed in the continuously-variable shifting state, that is, while the differential portion 11 is placed in the differential state. For instance, the hybrid control portion 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, while taking account of a power transmission loss, a load acting on various devices of the vehicle, an assisting torque generated by the second electric motor M2, etc. The hybrid control portion 52 controls the speed $N_E$ and torque $T_E$ of the engine 8, so as to obtain the calculated target engine output, and the amount of generation of the electric energy by the first electric motor M1. Thus, the hybrid control portion 52 functions as an electric motor control portion configured to control the operating states of the first and second electric motors M1, M2.

The hybrid control portion 52 is configured to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ for efficient operation of the engine 8, and the rotating speed of the power transmitting member 18 determined by the vehicle speed V and the selected gear position of the transmission portion 20. That is, the hybrid control portion 52 determines a target value of the overall speed ratio γT of the power transmitting system 10, so that the engine 8 is operated such that an operating point of the engine 8 follows a stored highest-fuel-economy curve (fuel-economy map or relation) stored in memory means. The target value of the overall speed ratio γT of the power transmitting system 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 52 controls the speed ratio γ0 of the differential portion 11, so as to obtain the target value of the overall speed ratio γT, so that the overall speed ratio γT can be controlled within a predetermined range, for example, between 13 and 0.5. The operating point of the engine 8 is a point which represents the operating state of the engine 8 and which is defined in the two-dimensional coordinate system in which selected two quantities indicative of the operating state of the engine 8 such as the engine speed $N_E$ and engine torque $T_E$ are taken along respective axes.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the power transmitting system is provided with an electric path through which an electric energy generated by conversion of a portion of a drive force of the engine 8 is converted into a mechanical energy.

The hybrid control portion 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control portion 52 is basically arranged to control the throttle actuator 97 on the basis of the operating amount $A_{CC}$ of the accelerator pedal (manually operable vehicle accelerating member) and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$.

Figure 7:
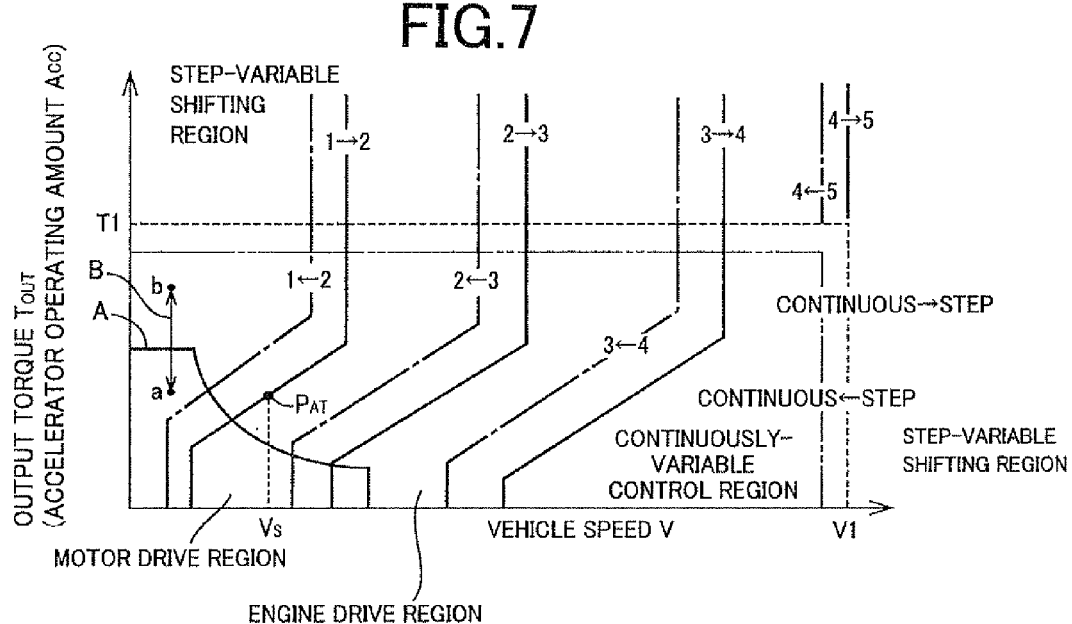
FIG. 7 is a view illustrating an example of a stored shifting boundary line map used for determining a shifting action of an automatic transmission portion, an example of a stored switching boundary line map used for switching the shifting state of the power transmitting system, and an example of a stored drive-power-source switching boundary line map defining a boundary line between an engine drive region and a motor drive region for switching between an engine drive mode and a motor drive mode, in the same two-dimensional coordinate system defined by control parameters in the form of a running speed and an output torque of the vehicle, such that those maps are related to each other.

Solid line A in FIG. 7 represents an example of a boundary line defining an engine-drive region and a motor-drive region, for switching the vehicle drive power source for starting and driving the vehicle, between the engine 8 and the second electric motor M2. In other words, the vehicle drive mode is switchable between an "engine drive mode" corresponding to the engine-drive region in which the vehicle is started and driven with the engine 8 used as the vehicle drive power source, and the "motor drive mode" corresponding to the motor-drive region in which the vehicle is driven with the second electric motor M2 used as the vehicle drive power source. A predetermined stored relationship representing the boundary line (solid line A) of FIG. 7 for switching between the engine drive mode and the motor drive mode is an example of a drive-power-source switching boundary line map (drive-power-source map) in a two-dimensional coordinate system defined by control parameters in the form of the vehicle speed V and a drive-force-related value in the form of the output torque $T_{OUT}$. This drive-power-source switching boundary line map is stored in the memory 56, together with the shifting boundary line map (shifting map) indicated by solid lines and one-dot chain lines in FIG. 7.

The hybrid control portion 52 determines whether the vehicle condition is in the motor-drive region or engine-drive region, and establishes the motor drive mode or engine drive mode. This determination is made on the basis of the vehicle condition represented by the vehicle speed V and the required output torque $T_{OUT}$, and according to the drive-power-source switching boundary line map of FIG. 7. As is understood from FIG. 7, the motor drive mode is generally established by the hybrid control portion 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low.

For reducing a dragging of the engine 8 in its non-operated state and improving the fuel economy in the motor drive mode, the hybrid control portion 52 is configured to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control portion 52 selectively places the engine 8 in the operated state and the non-operated state to selectively establish the engine drive mode and the motor drive mode. To this end, the hybrid control portion 52 includes an engine start/stop control portion 66 configured to start and stop the engine 8. This engine start/stop control portion 66 selectively starts or stops the engine 8 when the hybrid control portion 52 selects the engine drive mode or the motor drive mode on the basis of the vehicle condition and according to the drive-power-source switching boundary line map illustrated in FIG. 7 by way of example.

When a point representing the vehicle condition is moved from a point "a" in the motor drive region to a point "b" in the engine drive region as a result of an increase of the required output torque $T_{OUT}$ due to a depressing operation of the accelerator pedal, as indicated by solid line B between the points "a" and "b" in FIG. 7, for example, the engine start/stop control portion 66 energizes the first electric motor M1 to raise the first electric motor speed $N_{M1}$, for operating the first electric motor M1 as an engine starter, to raise the engine speed $N_E$ to a predetermined value $N_E'$ at which the engine 8 can be started with ignition by the ignition device 99. Thus, the vehicle drive mode is changed from the motor drive mode to the engine drive mode under the control of the hybrid control portion 52. The engine start/stop control portion 66 may be configured to rapidly raise the first electric motor speed $N_{M1}$ for rapidly raise the engine speed $N_E$ to the predetermined value $N_E'$. In this case, the resonance of the engine 8 upon starting of the engine 8 which would take place at the engine speed $N_E$ lower than an idling speed $N_{EIDL}$ as well known in the art can be efficiently avoided or reduced.

When the point representing the vehicle condition is moved from the point "b" in the engine drive region to the point "a" in the motor drive region as a result of a decrease of the required output torque $T_{OUT}$ due to a releasing operation of the accelerator pedal, as indicated by the solid line B in FIG. 7, the engine start/stop control portion 66 commands the fuel injecting device 98 to stop a fuel supply to the engine 8, namely, to implement a fuel cut of the engine 8, for stopping the engine 8, Thus, the vehicle drive mode is changed from the engine drive mode to the motor drive mode under the control of the hybrid control portion 52. The engine start/stop control portion 66 may be configured to rapidly lower the first electric motor speed $N_{M1}$ for rapidly lower the engine speed $N_E$ to zero or a value close to zero. In this case, the resonance of the engine 8 upon stopping of the engine 8 can be efficiently avoided or reduced. Alternatively, the engine start/stop control portion 66 is configured to lower the first electric motor speed $N_{M1}$ for lowering the engine speed $N_E$ before implementing the fuel cut of the engine 8, and then implement the fuel cut at the predetermined engine speed $N_E'$ for stopping the engine 8.

The hybrid control portion 52 is further capable of performing a so-called "drive-force assisting" operation (torque assisting operation) to assist the engine 8, by supplying the second electric motor M2 with an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine drive mode.

The hybrid control portion 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control portion 52 is further arranged to hold the engine speed $N_E$ at a desired value owing to the electric CVT function of the differential portion 11, by controlling the first electric motor speed $N_{M1}$ and/or second electric motor speed $N_{M2}$, irrespective of whether the vehicle is stationary or running. For example, the hybrid control portion 52 is arranged to raise the engine speed $N_E$ by raising the first electric motor speed $N_{M1}$ while the second electric motor speed $N_{M2}$ determined by the vehicle speed V is held substantially constant, as is apparent from the collinear chart of FIG. 3.

The high-speed-gear determining portion 62 is configured to determine whether the gear position to which the power transmitting system 10 should be shifted on the basis of the vehicle condition and according to the shifting boundary line map stored in the memory 56 and indicated in FIG. 6 by way of example is a high-speed-gear position, for example, the fifth gear position. This determination is made by determining whether the gear position selected by the step-variable shifting control portion 54 is the fifth gear position or not, for determining which one of the switching clutch C0 and brake B0 should be engaged to place the power transmitting system 10 in the step-variable shifting state.

The switching control portion 50 is configured to selectively switch the power transmitting system 10 between the continuously-variable shifting state and the step-variable shifting state, that is, between the differential state and the locked state, by engaging and releasing the coupling devices (switching clutch C0 and brake B0) on the basis of the vehicle condition. For example, the switching control portion 50 is arranged to determine whether the shifting state of the power transmitting system 10 (differential portion 11) should be changed, on the basis of the vehicle condition represented by the vehicle speed V and the required output torque $T_{OUT}$ and according to the switching boundary line map (switching control map or relation) stored in the memory 56 and indicated by broken lines and two-dot chain line in FIG. 7 by way of example, namely, whether the vehicle condition is in a continuously-variable shifting region (a differential region) for placing the power transmitting system 10 in the continuously-variable shifting state, or in a step-variable shifting region (a non-differential region) for placing the power transmitting system 10 in the step-variable shifting state. The switching control portion 50 places the power transmitting system 10 in the continuously-variable shifting state or step-variable shifting state, depending upon whether the vehicle condition is in the continuously-variable shifting region or in the step-variable shifting region.

Described in detail, when the switching control portion 50 determines that the vehicle condition is in the step-variable shifting region, the switching control portion 50 disables the hybrid control portion 52 to implement a hybrid control or continuously-variable shifting control, and enables the step-variable shifting control portion 54 to implement a predetermined step-variable shifting control in which the automatic transmission portion 20 is automatically shifted according to the shifting boundary line map stored in the memory 56 and indicated in FIG. 7 by way of example. FIG. 2 indicates the combinations of the engaging actions of the hydraulically operated frictional coupling devices C0, C1, C2, B0, B1, B2 and B3, which are stored in the memory 56 and which are selectively used for automatic shifting of the automatic transmission portion 20. In the step-variable shifting state, the power transmitting system 10 as a whole constituted by the differential portion 11 and the automatic transmission portion 20 functions as a so-called step-variable automatic transmission which is automatically shifted according to the table of FIG. 2.

When the high-speed-gear determining portion 62 has determined that the power transmitting system 10 should be shifted to the fifth gear position, the switching control portion 50 commands the hydraulic control unit 42 to release the switching clutch C0 and engage the switching brake B0, for enabling the differential portion 11 to function as an auxiliary transmission having a fixed speed ratio γ0 of 0.7, for example, so that the power transmitting system 10 as a whole is placed in a high-speed gear position so-called "an overdrive gear position" having a speed ratio lower than 1.0. When the high-speed-gear determining portion 62 has not determined that the power transmitting system 10 should be shifted to the fifth gear position, the switching control portion 50 commands the hydraulic control unit 42 to engage the switching clutch C0 and release the switching brake B0, for enabling the differential portion 11 to function as an auxiliary transmission having a fixed speed ratio γ0 of 1.0, for example, so that the power transmitting system 10 as a whole is placed in a speed-reducing gear position having a speed ratio not lower than 1.0. Thus, when the power transmitting system 10 is switched to the step-variable shifting state by the switching control portion 50, the differential portion 11 operable as the auxiliary transmission is placed in a selected one of two gear positions under the control of the switching control portion 50 while the automatic transmission portion 20 connected in series to the differential portion 11 functions as a step-variable transmission, so that the power transmitting system 10 as a whole functions as the so-called step-variable automatic transmission.

When the switching control portion 50 has determined that the vehicle condition is in the continuously-variable shifting region for placing the power transmitting system 10 in the continuously-variable shifting state, the switching control portion 50 commands the hydraulic control unit 42 to release both of the switching clutch C0 and brake B0, for placing the differential portion 11 in the continuously-variable shifting state. At the same time, the switching control portion 50 enables the hybrid control portion 52 to implement the hybrid control, and commands the step-variable shifting control portion 54 to select and hold a predetermined one of the gear positions, or to permit the automatic transmission portion 20 to be automatically shifted according to the shifting boundary line map stored in the memory 56 and indicated in FIG. 7 by way of example. In the latter case, the variable-step shifting control portion 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control portion 50 functions as the continuously variable transmission while the automatic transmission portion 20 connected in series to the differential portion 11 functions as the step-variable transmission, so that the power transmitting system 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the power transmitting system 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the power transmitting system 10 is continuously variable.

The maps of FIG. 7 will be described in detail. The shifting boundary line map (shifting control map or relation) shown in FIG. 7 by way of example and stored in the memory 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 7, the solid lines indicate the shift-up boundary lines each of which is a series of shifting points used to determine whether the automatic transmission portion 20 should be shifted up, while the one-dot chain lines indicate the shift-down boundary lines each of which is a series of shifting points used to determine whether the automatic transmission portion 20 should be shifted down. The above-indicated shifting points of the automatic transmission portion 20 are operating points of the power transmitting system 10, which are defined by at least one quantity such as the overall speed ratio γT of the power transmitting system 10, the required output torque $T_{OUT}$, the accelerator pedal operating amount $A_{CC}$ and the vehicle speed V, and which are used to determine whether a shifting action of the automatic transmission portion 20 should take place. In the example of the shifting boundary line map of FIG. 7, a point $P_{AT}$ is one of the shifting points used to make the determination as to whether the shift-up action of the automatic transmission portion 20 from the first gear position to the second gear position should take place. Where the shifting point $P_{AT}$ is a point of intersection between a horizontal straight line indicative of the actual required output torque $T_{OUT}$ and the shift-up boundary line for the shift-up action from the first gear position to the second gear position, the step-variable shifting control portion 54 determines that the automatic transmission portion 20 should be shifted up from the first gear position to the second gear position, when the vehicle speed V rises beyond a shifting-point speed Vs corresponding to the shifting point $P_{AT}$, that is, when the operating point indicative of the operating state of the power transmitting system 10 has reached the shifting point $P_{AT}$ as a result of a rise of the vehicle speed while the required output torque $T_{OUT}$ is held constant at the value corresponding to the shifting point $P_{AT}$, for example. The shift-up boundary lines and shift-down boundary lines will be collectively referred to as "shifting boundary lines", unless otherwise specified.

The broken lines in FIG. 7 represent the upper vehicle-speed limit V1 and the upper output-torque limit T1 which are used for the switching control portion 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 7 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 7 constitute the stored switching pattern or boundary line map (switching control map or relation) used by the switching control portion 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control portion 50 switches the power transmitting system 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control portion 50 may be configured to place the power transmitting system 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 60 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the power transmitting system 10 is placed in the step-variable shifting state while the vehicle is in the high-speed running state. This determination is effective to reduce a possibility of deterioration of the fuel economy of the vehicle if the power transmitting system 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

As described above, the differential portion 11 of the present power transmitting system 10 is switchable between its continuously-variable shifting state and its step-variable shifting state, under the control of the switching control portion 50 on the basis of the vehicle condition. Further, the power transmitting system 10 is switchable between the motor drive mode and the engine drive mode, under the control of the hybrid control portion 52 on the basis of the vehicle condition. For switching the power transmitting system 10 between the motor and engine drive modes, the engine start/stop control portion 66 selectively starts and stops the engine 8.

Figure 8:
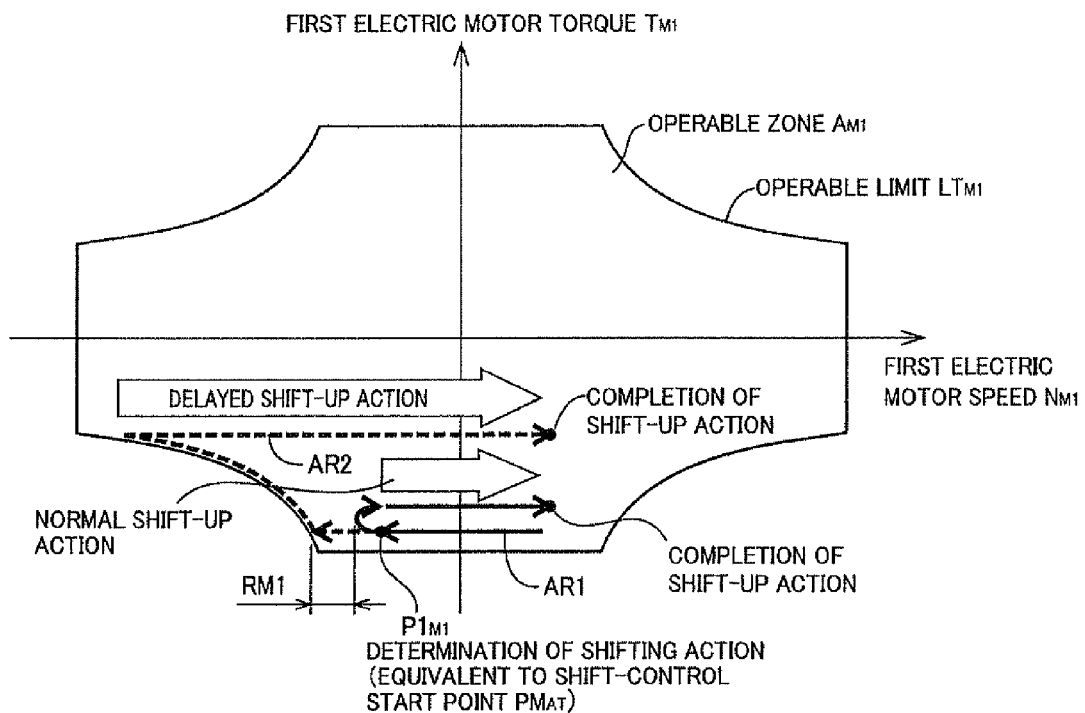
FIG. 8 is a view illustrating movements of an operating point of a first electric motor of the vehicular power transmitting system of FIG. 1 defined by its torque and speed taken along respective vertical and horizontal axes of a two-dimensional coordinate system, in relation to an operable zone of the first electric motor, before and during a shift-up action of the automatic transmission portion.

The first electric motor M1 generates a reaction torque resisting the engine torque $T_E$ in the engine drive mode while the differential portion 11 is placed in the non-locked state. In this instance, the hybrid control portion (electric motor control portion) 52 limits the output torque $T_{M1}$ of the first electric motor M1 (hereinafter referred to as "first electric motor torque $T_{M1}$") as the reaction torque, in relation to the first electric motor speed $N_{M1}$. Described in detail, the hybrid control portion 52 stores information or data representative of an operable zone $A_{M1}$ of the first electric motor M1 as indicated in FIG. 8, which is obtained by experimentation while taking account of a maximum permissible output, thermal durability and mechanical durability of the first electric motor. The hybrid control portion 52 controls the first electric motor M1 such that an operating point $P_{M1}$ of the first electric motor M1 (hereinafter referred to as "first electric motor operating point $P_{M1}$") which is defined by the first electric motor torque $T_{M1}$ and first electric motor speed $N_{M1}$ and which represents the operating state of the first electric motor M1 is moved within the operable zone $A_{M1}$. When the first electric motor operating point $P_{M1}$ has moved to an operable limit $LT_{M1}$ defining the periphery of the operable zone $A_{M1}$, the hybrid control portion 52 implements an output limitation of the first electric motor M1 by limiting the first electric motor torque $T_{M1}$ and/or the first electric motor speed $N_{M1}$, so as to prevent the first electric motor operating point $P_{M1}$ from moving out of the operable zone $A_{M1}$, so that the first electric motor M1 is usually operated with the first electric motor operating point $P_{M1}$ being moved with some amount of margin with respect to the operable limit $LT_{M1}$, whereby the operating point PM1 does not reach the operable limit $LT_{M1}$. This control of the first electric motor M1 by the hybrid control portion 52 is implemented irrespective of whether the automatic transmission portion 20 is in the process of a shifting action or not.

As described above, the step-variable shifting control portion 54 makes the determination as to whether a shifting action of the automatic transmission portion 20 should take place, according to the shifting boundary line map as illustrated in FIG. 7 by way of example. The shift-up boundary lines and the shift-down boundary lines of the shifting boundary line map, that is, the shifting points defining those shift-up and shift-down boundary lines are determined so that the first electric motor M1 is operated with the first electric motor operating point $P_{M1}$ being held within the operable zone $A_{M1}$, without reaching the operable limit $LT_{M1}$, after the determination of the shift-up or shift-down action is made. Namely, the shifting boundary line map of FIG. 7 defines the nominal shift-up and shift-down boundary lines.

Figure 9:
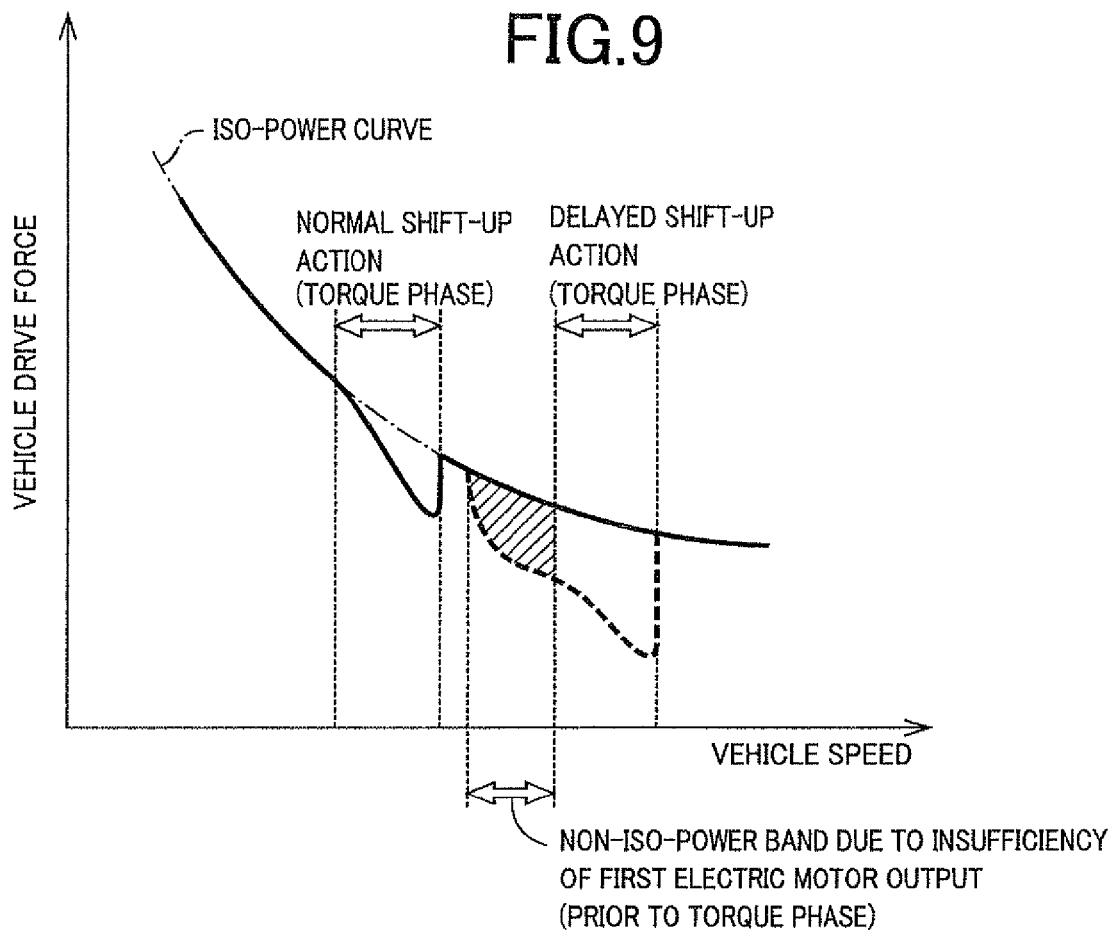
FIG. 9 is a view indicating a change of a vehicle drive force during a normal shift-up action and a delayed shift-up action of the automatic transmission portion of the vehicular power transmitting system of FIG. 1, when a relationship between the vehicle speed and the vehicle drive force changes along an iso-power curve as the vehicle speed rises at a given operating amount of an accelerator pedal.

FIG. 8 indicates movements of the first electric motor operating point $P_{M1}$ defined by the first electric motor torque $T_{M1}$ and the first electric motor speed $N_{M1}$ taken along respective vertical and horizontal axes of a two-dimensional coordinate system, in relation to the operable zone AM1 of the first electric motor M1, before and during a shift-up action of the automatic transmission portion 20. The first electric motor operating point $P_{M1}$ takes a path of movement AR1 indicated by arrow-headed solid line indicated in FIG. 8 when a normal shift-up action of the automatic transmission portion 20 at a steady-state value (normal-state) value of the working fluid temperature $TEMP_{ATF}$ after the warm-up operation of the automatic transmission portion 20 is performed in the engine drive mode in the non-locked state of the differential portion 11. When the working fluid temperature $TEMP_{ATF}$ is extremely low, the moment of initiation of a mechanical action to perform the shift-up action of the automatic transmission portion 20 is considerably delayed with respect to the moment of generation of a control signal to initiate the shift-up action, that is, when the shifting response of the automatic transmission portion 20 is low or deteriorated due to the low working fluid temperature $TEMP_{ATF}$, the first electric motor operating point $P_{M1}$ takes a path of movement AR2 indicated by arrow-head broken line also indicated in FIG. 8. A point $A1_{M1}$ indicated in FIG. 8 is the first electric motor operating point $P_{M1}$ at the time when the determination that the shift-up action should take place is made according to the shift-up boundary lines of FIG. 7. FIG. 9 indicates a change of the vehicle drive force during the normal shift-up action and the delayed shift-up action of the automatic transmission portion 20 indicated in FIG. 8, when a relationship between the vehicle speed V and the vehicle drive force changes along an iso-power curve as the vehicle speed V rises at a given operating amount of the accelerator pedal. In the example of FIG. 8, the paths of movements AR1, AR2 of the first electric motor operating point PM1 are located on the negative side of the first electric motor torque $T_{M1}$ (vertical axis of the coordinate system), since the direction of the reaction torque $T_{M1}$ of the first electric motor M1 is opposite to the direction of the engine torque $T_E$.

When the normal shift-up action is performed, the first electric motor operating point PM1 moves along the path AR1 (indicated by the arrow-headed solid line) indicated in FIG. 8, without reaching the operable limit $LT_{M1}$. When the delayed shift-up action is performed while the shifting response of the automatic transmission portion 20 is low, on the other hand, the first electric motor speed $N_{M1}$ is kept lowered according to a change of the vehicle speed V, even after the moment of the determination to perform the shift-up action at the same first electric motor operating point $P1_{M1}$ as in the case of the normal shift-up action, unlike the first electric motor speed $N_{M1}$ which starts to rise when the normal shift-up action is performed. In this case of the delayed shift-up action, the first electric motor operating point $P_{M1}$ takes the path AR2 (indicated by the arrow-headed broken line) and reaches the operable limit $LT_{M1}$, and the first electric motor torque $T_{M1}$ is limited to prevent the operating point PM1 from moving out of the operable zone $A_{M1}$. Referring to FIG. 9, the vehicle drive force in the case of the normal shift-up action wherein the first electric motor operating point $P_{M1}$ does not reach the operable limit $LT_{M1}$ is reduced along the iso-power curve until the torque phase of the normal shift-up action is initiated. In the case of the delayed shift-up action wherein the first electric motor operating point $P_{M1}$ reaches the operable limit $LT_{M1}$ and the first electric motor torque $T_{M1}$ is limited, the vehicle drive force drops from the value of the iso-power curve due to insufficiency of output of the first electric motor M1 prior to the moment of initiation of the torque phase, as indicated by hatched lines in FIG. 9. It will be understood that the vehicle drive force drops from the value of the iso-power curve prior to the moment of initiation of the torque phase of the shift-up action when the shift-up action is performed while the shifting response of the automatic transmission portion 20 is low, if the determination to perform the shift-up action while the shifting response is low is made at the same point of time as the determination to perform the shift-up action while the shifting response is not low. Namely, the vehicle drive force drops from the value of the so-power curve prior to the moment of initiation of the torque phase of the shift-up action, when the shift-up action is expected to be delayed due to the low shifting response of the automatic transmission portion 20, if the determination to perform this shift-up action is made at the same point of time as the determination to perform the shift-up action which is expected to be the normal or non-delayed shift-up action. The drop of the vehicle drive force causes deterioration of the shift-up action as felt by the vehicle operator.

In view of the fact described above, the control apparatus according to the present embodiment is configured to control the shifting actions of the automatic transmission portion 20, so as to prevent the deterioration of the shifting actions as felt by the vehicle operator due to the low shifting response of the automatic transmission portion 20.

The above-indicated vehicle-speed determining portion 70 is configured to detect the vehicle speed V with a suitable vehicle speed sensor, and to determine whether the detected actual vehicle speed V is in a high range, a medium range or a low range. Described in detail, the vehicle-speed determining portion 70 determines that the vehicle speed V is in the low range when the vehicle speed V is not higher than a low-speed threshold value VSP1, in the high range when the vehicle speed V is not lower than a high-speed threshold value VSP2, and in the medium range when the vehicle speed V is between the low-speed and high-speed threshold values VSP1 and VSP2. The low-speed threshold value VSP1 is lower than the high-speed threshold values VSP2, and these two threshold values VSP1, VSP2 are obtained by experimentation to determine a shifting-point vehicle-speed changing width $W_{VS}$ described below by reference to FIG. 10, while taking account of a fact that a possibility that the first electric motor operating point $P_{M1}$ reaches the operable limit $LT_{M1}$ and the output of the first electric motor M1 becomes insufficient immediately before or during the shifting action of the automatic transmission portion 20 increases with an increase of the vehicle speed V. The vehicle-speed determining portion 70 stores the thus determined low-speed and high-speed threshold values VSP1, VSP2.

The above-indicated working-fluid-temperature detecting portion 72 is configured to detect the working fluid temperature $TEMP_{ATF}$ with a suitable fluid temperature sensor.

The shifting-point changing portion 74 is configured to change the shifting points of the shift-up and shift-down boundary lines at which the automatic transmission portion 20 is commanded to initiate the shift-up and shift-down actions, such that the moments of determination to perform the shift-up and shift-down actions are advanced as the shifting response of the automatic transmission portion 20 is reduced. The shifting-point changing portion 74 is further configured to increase the amount of change of the shifting points at the same shifting response of the automatic transmission portion 20, with an increase of the vehicle speed V. Described in detail referring to FIG. 10, the shifting-point changing portion 74 stores lines of relationship among the vehicle speed V, the working fluid temperature $TEMP_{ATF}$ and the above-indicated shifting-point changing width $W_{VS}$. The shifting-point changing portion 74 selects one of a plurality of lines of relationship between the working fluid temperature $TEMP_{ATF}$ and the shifting-point vehicle-speed changing width $W_{VS}$, which one line of relationship corresponds to the range of the vehicle speed V determined by the vehicle-speed determining portion 70. Described in detail by reference to FIG. 10, the shifting-point changing portion 74 selects the line of relationship corresponding to the low range of the vehicle speed V when the vehicle-speed determining portion 70 determines that the detected vehicle speed V is in the low range (indicated as "LOW" in FIG. 10). The shifting-point changing portion 74 selects the line of relationship corresponding to the medium range of the vehicle speed V when the vehicle-speed determining portion 70 determines that the detected vehicle speed V is in the medium range (indicated as "MEDIUM" in FIG. 10), and selects the line of relationship corresponding to the high range of the vehicle speed V when the vehicle-speed determining portion 70 determines that the detected vehicle speed V is in the high range (indicated as "HIGH" in FIG. 10). Then, the shifting-point changing portion 74 determines the shifting-point vehicle-speed changing width $W_{VS}$ on the basis of the working fluid temperature $TEMP_{ATF}$ detected by the working-fluid-temperature detecting portion 72, and according to the selected line of relationship between the temperature $TEMP_{ATF}$ and the width $W_{VS}$. The shifting-point changing portion 74 moves or shifts the nominal shift-up and shift-down boundary lines of FIG. 7 (which are used when the working fluid temperature $TEMP_{ATF}$ has a steady-state or normal-state value after the warm-up operation of the vehicle), by an amount corresponding to the determined shifting-point vehicle-speed changing width $W_{VS}$, in the direction of change of the vehicle speed V along the horizontal axis of the coordinate system of the shifting boundary line map of FIG. 7. In other words, the shifting-point changing portion 74, which functions as a shifting-map changing portion to change the nominal shifting boundary line map, moves the shifting-point vehicle speed values collectively defining the shift-up and shift-down boundary lines, by an amount corresponding to the shifting-point vehicle-speed changing width WVS, to thereby move or shift the nominal shift-up and shift-down boundary lines in the direction of the horizontal axis of FIG. 7. Preferably, the shifting-point changing portion 74 changes the shifting points of the automatic transmission portion 20 according to the map of FIG. 10, during running of the vehicle in the non-locked state of the differential portion 11.

Figure 10:
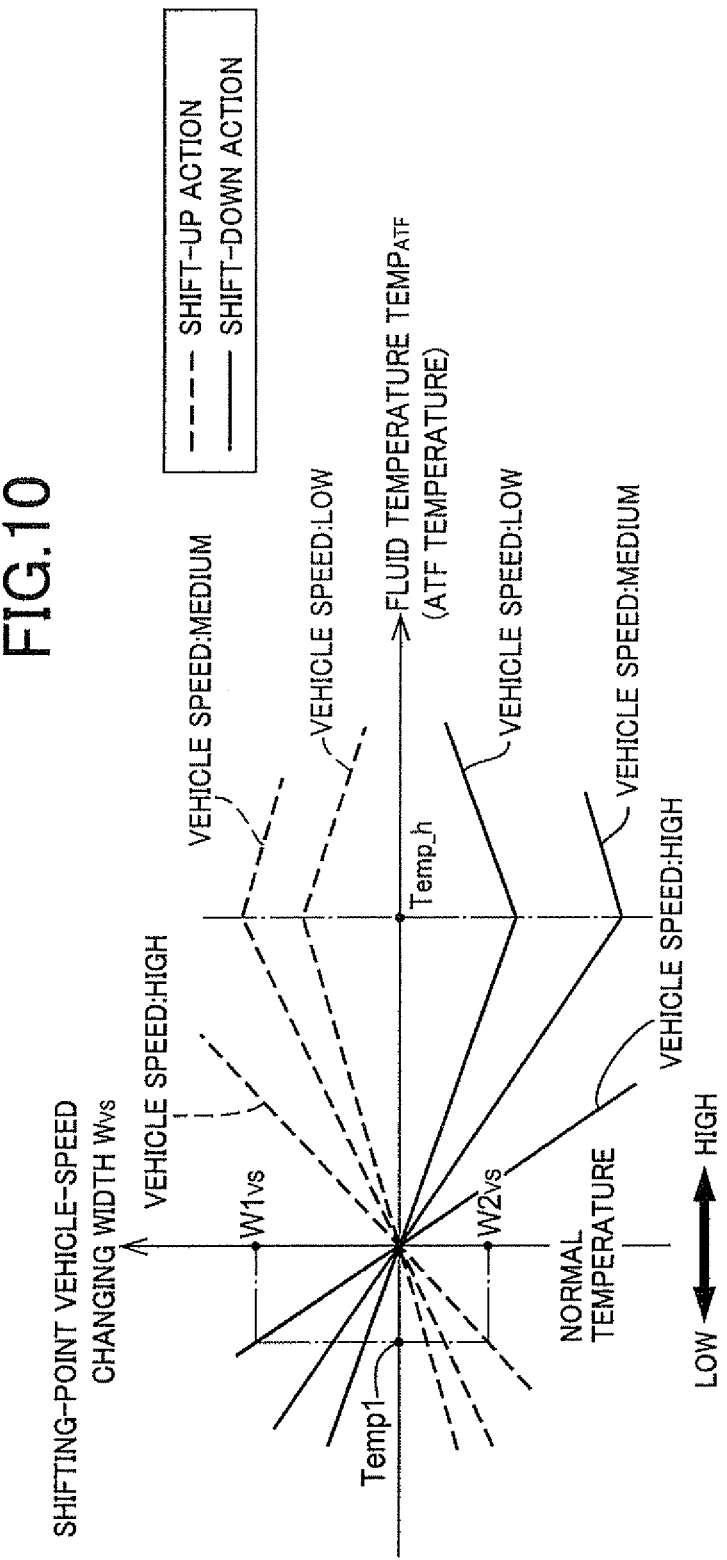
FIG. 10 is a view indicating a map which is used by the electronic control device of FIG. 4 for determining a shifting-point vehicle-speed changing width on the basis of the vehicle speed and a temperature of a working fluid, and which is defined in a two-dimensional coordinate system in which the working fluid temperature and the shifting-point vehicle-speed changing width are taken along respective horizontal and vertical axes.

FIG. 10 indicates the map used by the shifting-point changing portion 74 for determining the shifting-point vehicle-speed changing width $W_{VS}$ on the basis of the vehicle speed V and the working fluid temperature $TEMP_{ATF}$, the map being defined in the two-dimensional coordinate system in which the working fluid temperature $TEMP_{ATF}$ and the shifting-point vehicle-speed changing width $W_{VS}$ are taken along the respective horizontal and vertical axes. The shifting-point vehicle-speed changing width $W_{VS}$ determines an amount of change of the shifting-point vehicle speed V in the direction of the horizontal axis with respect to the nominal shifting-point vehicle speed V used at the steady-state or normal-state value of the working fluid temperature $TEMP_{ATF}$ after completion of the warm-up operation of the automatic transmission portion 20. According to the lines of relationship of FIG. 10 between the working fluid temperature $TEMP_{ATF}$ and the shifting-point vehicle-speed changing width $W_{VS}$, the width $W_{VS}$ is zero when the working fluid temperature $TEMP_{ATF}$ has the normal-state value. The lines of relationship of FIG. 10 are obtained by experimentation, so as to reduce an amount of influence of a change of the working fluid temperature $TEMP_{ATF}$ on the path of movement of the first electric motor operating point $P_{M1}$ indicated in FIG. 8, more specifically, so as to reduce an amount of change of a margin RM1 of the first electric motor operating point $P_{M1}$ with respect to the operable limit $LT_{M1}$, which is caused by a change of the working fluid temperature $TEMP_{ATF}$. According to the lines of relationship of FIG. 10 between the temperature $TEMP_{ATF}$ and the width $W_{VS}$, the absolute value of the width $W_{VS}$ increases with an increase of the vehicle speed V. Further, the lines of relationship of FIG. 10 are determined such that the shifting-point vehicle-speed changing width $W_{VS}$ for the shift-up actions (indicated by broken lines) decreases with a decrease of the working fluid temperature $TEMP_{ATF}$ from a critical value Temp_h, while the shifting-point vehicle-speed changing width $W_{VS}$ for the shift-down action (indicated by solid lines) increases with the decrease of the working fluid temperature $TEMP_{ATF}$ from the critical value Temp_h, where the sign of the positive and negative signs of the shifting-point vehicle speed changing width $W_{VS}$ are taken into consideration. Further, the shifting-point vehicle-speed changing width $W_{VS}$ for the shift-up actions decreases toward zero with an increase of the working fluid temperature $TEMP_{ATF}$ from the critical value Temp_h, while the shifting-point vehicle-speed changing width $W_{VS}$ for the shift-down action increases toward zero with the increase of the working fluid temperature $TEMP_{ATF}$ from the critical value Temp_h, Thus, the lines of relationship of FIG. 10 have opposite directions of inclination on the respective opposite sides of the critical value Temp_h of the working fluid temperature $TEMP_{ATF}$, because the shifting response of the automatic transmission portion 20 is reduced as the viscosity of the working fluid increases as the working fluid temperature $TEMP_{ATF}$ is lowered down to the critical value Temp_h, but the shifting response is reduced as the working fluid temperature $TEMP_{ATF}$ is raised from the critical value Temp_h, due to leakage of the working fluid from hydraulic components associated with the shifting actions, or circulation of the working fluid through the hydraulic components. Accordingly, the lines of relationship of FIG. 10 are determined such that the shifting-point vehicle speed changing width $W_{VS}$ for the shift-down actions (indicated by the solid lines) increases in the positive direction with a decrease of the shifting response of the automatic transmission portion 20 as the working fluid temperature $TEMP_{ATF}$ is lowered, while the shifting-point vehicle speed changing width $W_{VS}$ for the shift-up actions (indicated by the broken lines) increases in the negative direction with a decrease of the shifting response of the automatic transmission portion 20 as the working fluid temperature $TEMP_{ATF}$ is lowered.

Figure 11:
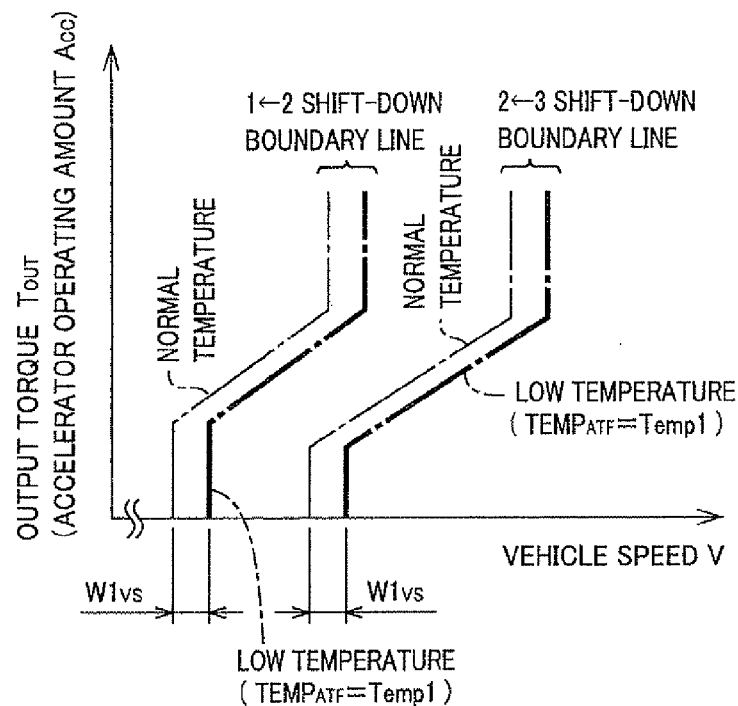
FIG. 11 is a view for explaining a manner of changing nominal shift-down boundary lines of FIG. 7 for a shift-down action from a second gear position to a first gear position and a shift-down action from a third gear position to the second gear position, on the basis of the shifting-point vehicle-speed changing width determined according to the map of FIG. 10.
Figure 12:
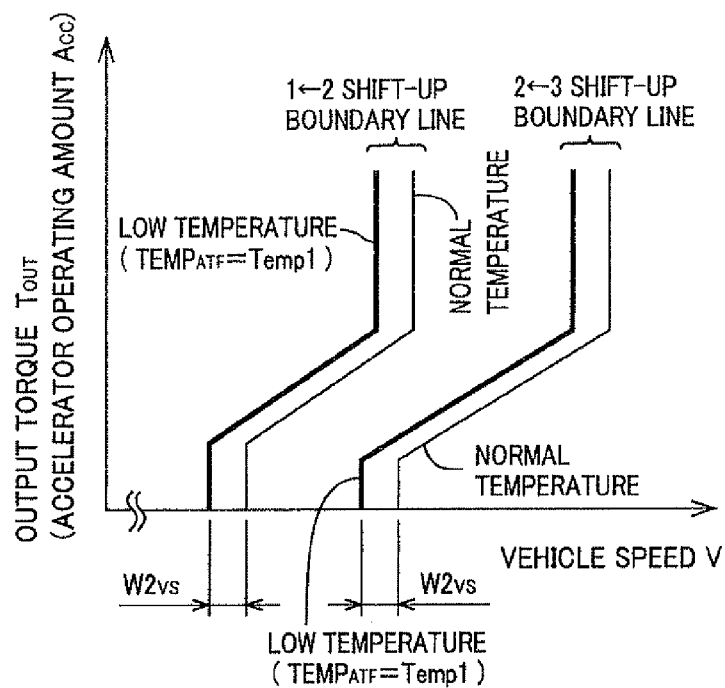
FIG. 12 is a view for explaining a change of shift-up boundary lines of FIG. 7 for a shift-up action from the first gear position to the second gear position and a shift-up action from the second gear position to the third gear position, on the basis of the shifting-point vehicle-speed changing width determined according to the map of FIG. 10.

FIG. 11 explains a manner of changing the nominal shift-down boundary lines of FIG. 7 for the shift-down action from the second gear position to the first gear position and the shift-down action from the third gear position to the second gear position, on the basis of the shifting-point vehicle-speed changing width $W_{VS}$ determined according to the map of FIG. 10, and FIG. 12 explains a manner of changing the nominal shift-up boundary lines of FIG. 7 for the shift-up action from the first gear position to the second gear position and the shift-up action from the second gear position to the third gear position, on the basis of the shifting-point vehicle-speed changing width $W_{VS}$ determined according to the map of FIG. 10. It is noted that the changes of the nominal shift-down and shift-up boundary lines are indicated in FIGS. 11 and 12, for illustrative purpose only, and that the principle of this invention is equally applicable to the changes of the nominal shift-down boundary lines for the shift-down action from the fourth gear position and the shift-up action to the four gear position, for example.

As described above, the shifting-point changing portion 74 moves or shifts the nominal shift-up and shift-clown boundary lines of FIG. 7 by the determined shifting-point vehicle-speed changing width $W_{VS}$ in the direction of change of the vehicle speed V, that is, in the direction parallel to the horizontal axis of the coordinate system of FIG. 7. The operation of the shifting-point changing portion 74 when the vehicle speed V is in the high range while the working fluid temperature $TEMP_{ATF}$ is equal to a value Temp1 will be described by reference to FIGS. 10-12. Initially, the shifting-point changing portion 74 determines $W1_{VS}$ as the shifting-point vehicle-speed changing width $W_{VS}$ for the shift-down actions, and $W2_{VS}$ as the shifting-point vehicle-speed changing width $W_{VS}$ for the shift-up actions. Then, the shifting-point changing portion 74 moves the nominal shift-down boundary lines of FIG. 7 by the determined width $W1_{VS}$ in the positive direction of the vehicle speed V, as indicated in FIG. 11, and moves the nominal shift-up boundary lines of FIG. 7 by the determined width $W2_{VS}$ in the negative direction of the vehicle speed V, as indicated in FIG. 12. The movement of the nominal shift-down boundary lines in the positive direction of the vehicle speed V (in the direction of increase of the vehicle speed V), and the movement of the nominal shift-up boundary lines in the negative direction of the vehicle speed V (in the direction of decrease of the vehicle speed V) result in advancing the moment at which the determinations to perform the shift-down and shift-up actions are made. Thus, the shifting-point changing portion 74 is configured to determine the reduction or deterioration of the shifting response of the automatic transmission portion 20 on the basis of the working fluid temperature $TEMP_{ATF}$ and according to the map of FIG. 10 which is formulated to determine the shifting-point vehicle-speed changing width $W_{VS}$ on the basis of the shifting response of the automatic transmission portion 20 represented by the working fluid temperature $TEMP_{ATF}$, such that the shifting-point vehicle-speed changing width $W_{VS}$ for the shift-down actions increases in the positive direction, while the shifting-point vehicle-speed changing width $W_{VS}$ for the shift-up actions increases in the negative direction, as the shifting response is reduced. Accordingly, the nominal shift-down and shift-up boundary lines (shifting-point vehicle speed values defined by the boundary lines) are changed so as to advance the moment of determinations by the step-variable shifting control portion 54 to perform the shift-down and shift-up actions of the automatic transmission portion 20 when the working fluid temperature $TEMP_{ATF}$ is relatively low, that is, the shifting response of the automatic transmission portion 20 is relatively low.

Referring to the flow chart of FIG. 13, there will be described a shift control routine executed by the electronic control device 40 to control the automatic transmission portion 20 so as to prevent deterioration of the shifting actions as felt by the vehicle operator when the shifting response of the automatic transmission portion 20 is relatively low. This shift control routine is repeatedly executed with an extremely short cycle time of about several milliseconds to several tens of milliseconds. Preferably, the shift control routine of FIG. 13 is executed during running of the vehicle in the engine drive mode while the differential portion 11 is placed in the non-locked state.

Figure 13:
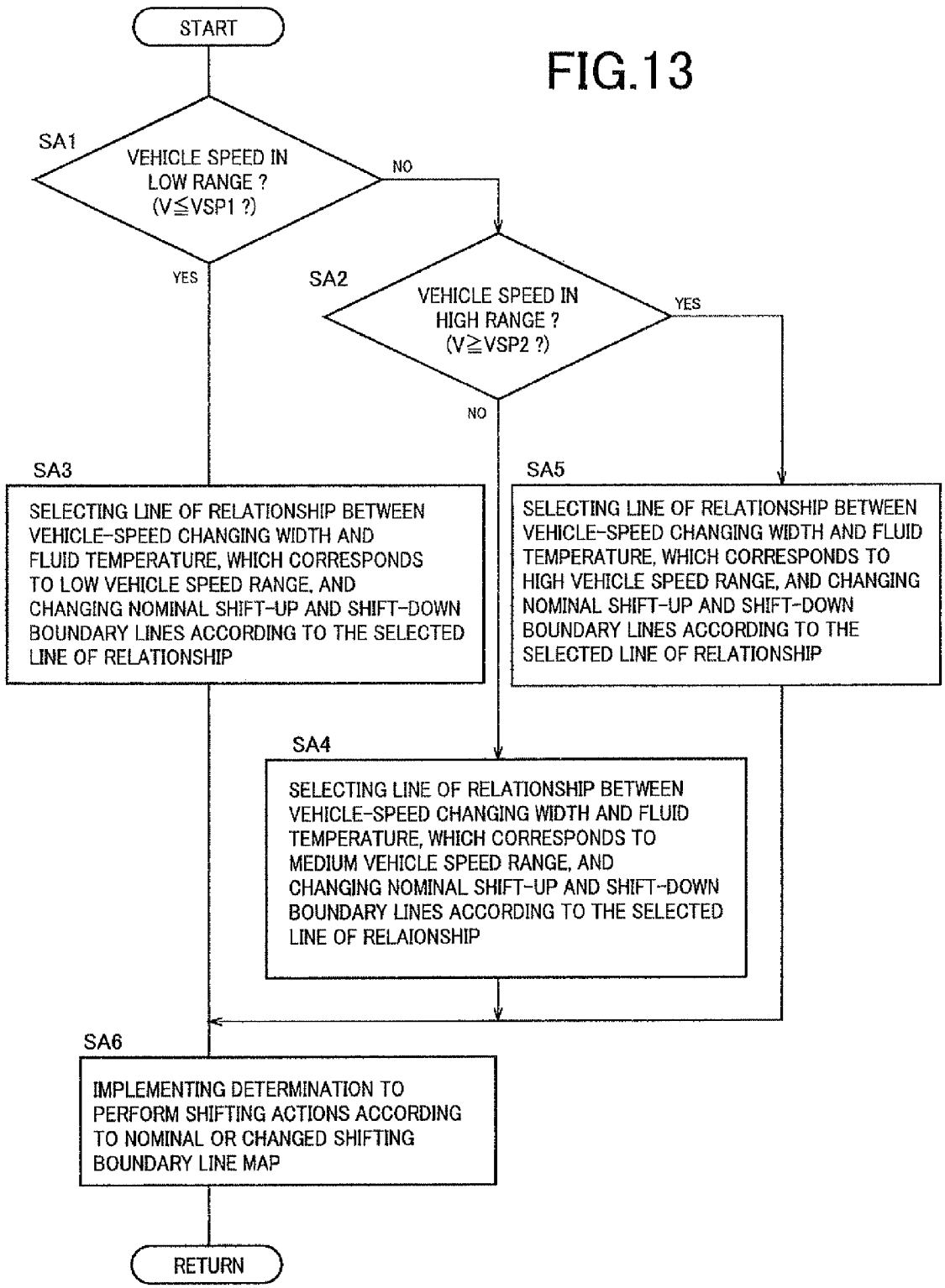
FIG. 13 is a flow chart illustrating a shift control routine executed by the electronic control device of FIG. 4 in the first embodiment to control the automatic transmission portion so as to prevent deterioration of shifting actions as felt by the vehicle operator when the shifting response of the automatic transmission portion is relatively low.

The shift control routine of FIG. 13 is initiated with step SA1 to determine whether the detected vehicle speed V is equal to or lower than the predetermined low-speed threshold value SP1. If an affirmative determination is obtained in step SA1, that is, if the vehicle speed V is in the predetermined low range, the control flow goes to step SA3. If a negative determination is obtained in step SA1, the control flow goes to step SA2.

Step SA2 is implemented to determine whether the detected vehicle speed V is equal to or higher than the predetermined high-speed threshold value SP2. If an affirmative determination is obtained in step SA2, that is, if the vehicle speed V is in the predetermined high range, the control flow goes to step SA5. If a negative determination is obtained in step SA1, the vehicle speed V is determined to be in the medium range, and the control flow goes to step SA4. It will be understood that the above-indicated steps SA1 and SA2 correspond to the vehicle-speed determining portion 70.

Step SA3 is implemented to detect the working fluid temperature $TEMP_{ATF}$ of the automatic transmission portion 20, select the line of relationship between the working fluid temperature $TEMP_{ATF}$ and the shifting-point vehicle-speed changing width $W_{VS}$, which corresponds to the low range of the vehicle speed V, and then determine the shifting-point vehicle-speed changing width $W_{VS}$ on the basis of the detected working fluid temperature $TEMP_{ATF}$ and according to the selected line of relationship. Then, the nominal shift-up and shift-clown boundary lines of FIG. 7 used at the steady-state or normal-state value of the working fluid temperature $TEMP_{ATF}$ after the warm-up operation of the vehicle are changed, that is, moved or shifted in the direction of change of the vehicle speed V, that is, in the direction of the horizontal axis of the coordinate system of the shifting boundary line map of FIG. 7. Thus, the nominal shifting boundary lines of FIG. 7 are changed in step SA3 on the basis of the detected working fluid temperature $TEMP_{ATF}$ and according to the line of relationship of FIG. 10 between the temperature $TEMP_{ATF}$ and the changing width $W_{VS}$ which corresponds to the low range of the vehicle speed V.

Like step SA3, step SA4 is implemented to detect the working fluid temperature $TEMP_{ATF}$ of the automatic transmission portion 20, select the line of relationship between the working fluid temperature $TEMP_{ATF}$ and the shifting-point vehicle-speed changing width $W_{VS}$, which corresponds to the medium range of the vehicle speed V, and then determine the shifting-point vehicle-speed changing width $W_{VS}$ on the basis of the detected working fluid temperature $TEMP_{ATF}$ and according to the selected line of relationship. Then, the nominal shift-up and shift-down boundary lines of FIG. 7 are changed, that is, moved or shifted in the direction of change of the vehicle speed V, that is, in the direction of the horizontal axis of the shifting boundary line map of FIG. 7. Thus, the nominal shifting boundary lines of FIG. 7 are changed in step SA4 on the basis of the detected working fluid temperature $TEMP_{ATF}$ and according to the line of relationship of FIG. 10 between the temperature $\text{TEMP}_{ATF}$ and the changing width $W_{VS}$ which corresponds to the medium range of the vehicle speed V.

Like step SA3, step SA5 is implemented to detect the working fluid temperature $\text{TEMP}_{ATF}$ of the automatic transmission portion 20, select the line of relationship between the working fluid temperature $\text{TEMP}_{ATF}$ and the shifting-point vehicle-speed changing width $W_{VS}$, which corresponds to the high range of the vehicle speed V, and then determine the shifting-point vehicle-speed changing width $W_{VS}$ on the basis of the detected working fluid temperature $\text{TEMP}_{ATF}$ and according to the selected line of relationship. Then, the nominal shift-up and shift-down boundary lines of FIG. 7 are changed, that is, moved or shifted in the direction of change of the vehicle speed V, that is, in the direction of the horizontal axis of the shifting boundary line map of FIG. 7. Thus, the nominal shifting boundary lines of FIG. 7 are changed in step SA5 on the basis of the detected working fluid temperature $\text{TEMP}_{ATF}$ and according to the line of relationship of FIG. 10 between the temperature $\text{TEMP}_{ATF}$ and the changing width $W_{VS}$ which corresponds to the high range of the vehicle speed V. It will be understood that the above-described steps SA3-SA5 corresponds to the working-fluid-temperature detecting portion 72 and the shifting-point changing portion 74.

Steps SA3-SA5 are followed by step SA6 corresponding to the step-variable shifting control portion 54, to make the determination as to whether a shifting action of the automatic transmission portion 20 should take place, according to the nominal shifting boundary line map of FIG. 7 or the shifting boundary line map changed in steps SA3-SA5, and on the basis of the detected vehicle condition represented by the required output torque $T_{OUT}$ (or the acceleration pedal operating amount $A_{CC}$) and the vehicle speed V.

The control apparatus in the form of the electronic control device 40 configured according to the present embodiment of this invention has the following advantages:

(A1) The shifting-point changing portion 74 is configured to determine the shifting-point vehicle-speed changing width $W_{VS}$ according to the map of FIG. 10, on the basis of the shifting response of the automatic transmission portion 20 such that the changing width $W_{VS}$ for the shift-down actions and the changing width $W_{VS}$ for the shift-up actions respectively increase in the positive and negative directions, as the shifting response is reduced. The shifting-point changing portion 74 changes the nominal shift-down and shift-up boundary lines (shifting-point vehicle speed values on the boundary lines) on the basis of the determined shifting-point vehicle-speed changing width $W_{VS}$. Thus, the shifting-point changing portion 74 is configured such that the shifting point at which the determination to perform the shifting action of the automatic transmission portion 20 is changed according to the shifting response of the automatic transmission portion 20, so that the determination as to whether the shifting action of the automatic transmission portion 20 should take place can be made while taking account of a possibility of a time delay of the shifting action due to a low degree of the shifting response of the automatic transmission portion 20, making it possible to prevent or reduce the deterioration or reduction of the shifting action as felt by the vehicle operator due to the low shifting response of the automatic transmission portion 20. Further, the shifting-point changing portion 74 is configured to prevent an excessive amount of margin of the first electric motor operating point $P_{M1}$ with respect to the operable limit $LT_{M1}$ (indicated in FIG. 8) when the shifting response of the automatic transmission portion 20 is excessively high, so that the output of the first electric motor M1 can be operated with the first electric motor operating point $P_{M1}$ being moved within the operable range $A_{M1}$ indicated in FIG. 8.

(A2) The shifting-point changing portion 74 uses the map of FIG. 10 to increase the shifting-point vehicle-speed changing width $W_{VS}$ in the positive direction for the shift-down actions, and in the negative direction for the shift-up actions, as the shifting response of the automatic transmission portion 20 is reduced. Accordingly, the nominal shift-down and shift-up boundary lines of FIG. 7 are moved or changed such that the moment at which the determination to perform the shifting action is made is advanced as the shifting response of the automatic transmission portion 20 is reduced. Thus, the time delay of the shifting action due to the low shifting response of the automatic transmission portion 20 is reduced by the advancement of the moment of the determination to perform the shifting action. The shifting-point changing portion 74 can prevent a change of the path of movement AR1 (indicated by the solid line in FIG. 8) of the first electric motor operating point $P_{M1}$ immediately before or during the shifting action of the automatic transmission portion 20 while the shifting response is low. Accordingly, it is possible to prevent the limitation of the output of the first electric motor M1 during the shifting action of the automatic transmission portion 20, which would take place when the first electric motor operating point $P_{M1}$ reaches the operable limit $LT_{M1}$ as indicated in FIG. 8. Accordingly, the deterioration of the shifting action as felt by the vehicle operator due to the low shifting response can be prevented or avoided. This aspect of the present embodiment to prevent or reduce the deterioration of the shifting action as felt by the vehicle operator will be further described by reference to FIGS. 14 and 15.

Figure 14:
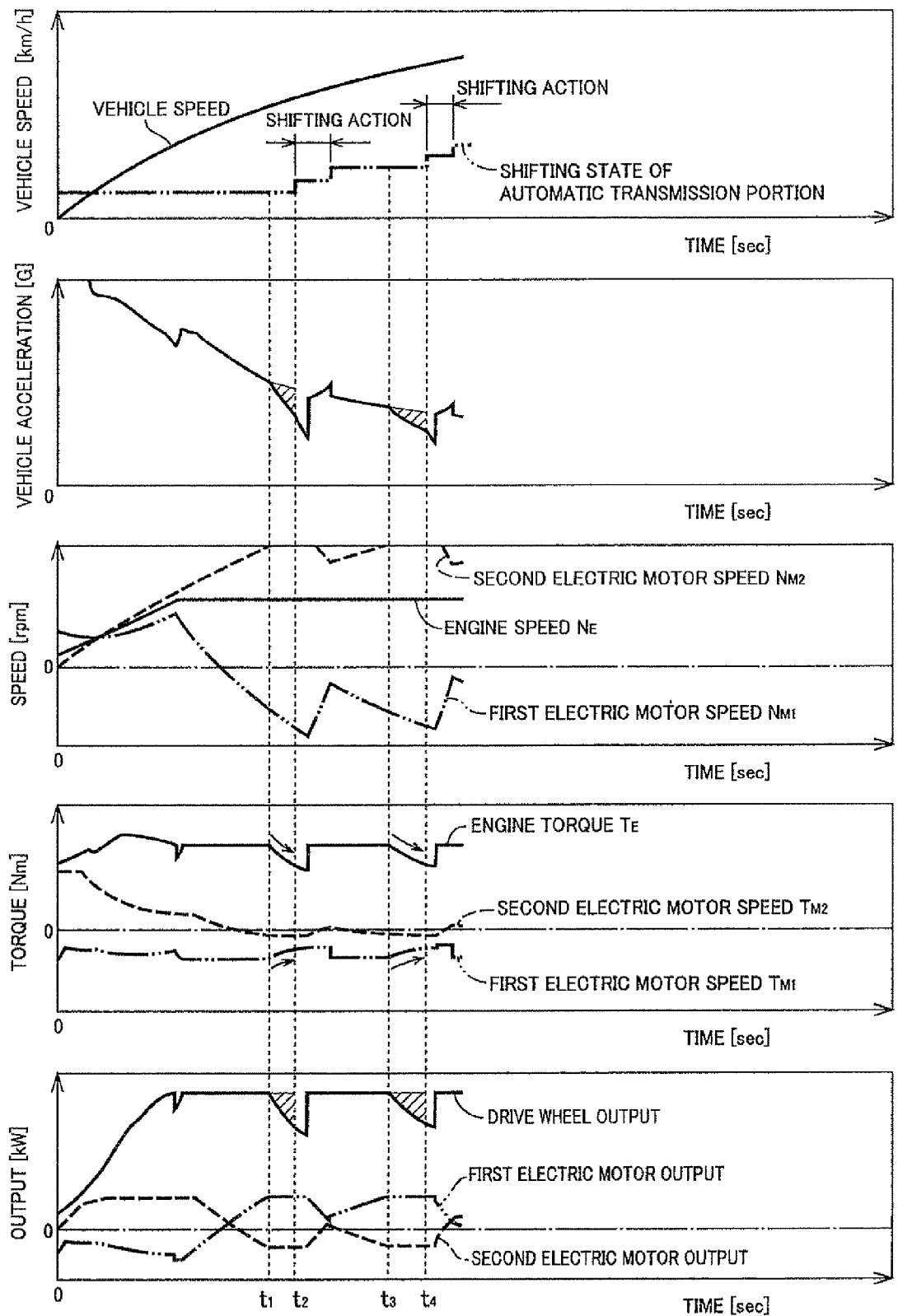
FIG. 14 is a time chart indicating shift-up actions of the automatic transmission portion as a result of a rise of the vehicle speed when the working fluid temperature is extremely low before a warm-up operation of the automatic transmission, in the prior art wherein the shifting-point is not changed according to a change of the shifting response of the automatic transmission portion determined by the working fluid temperature.
Figure 15:
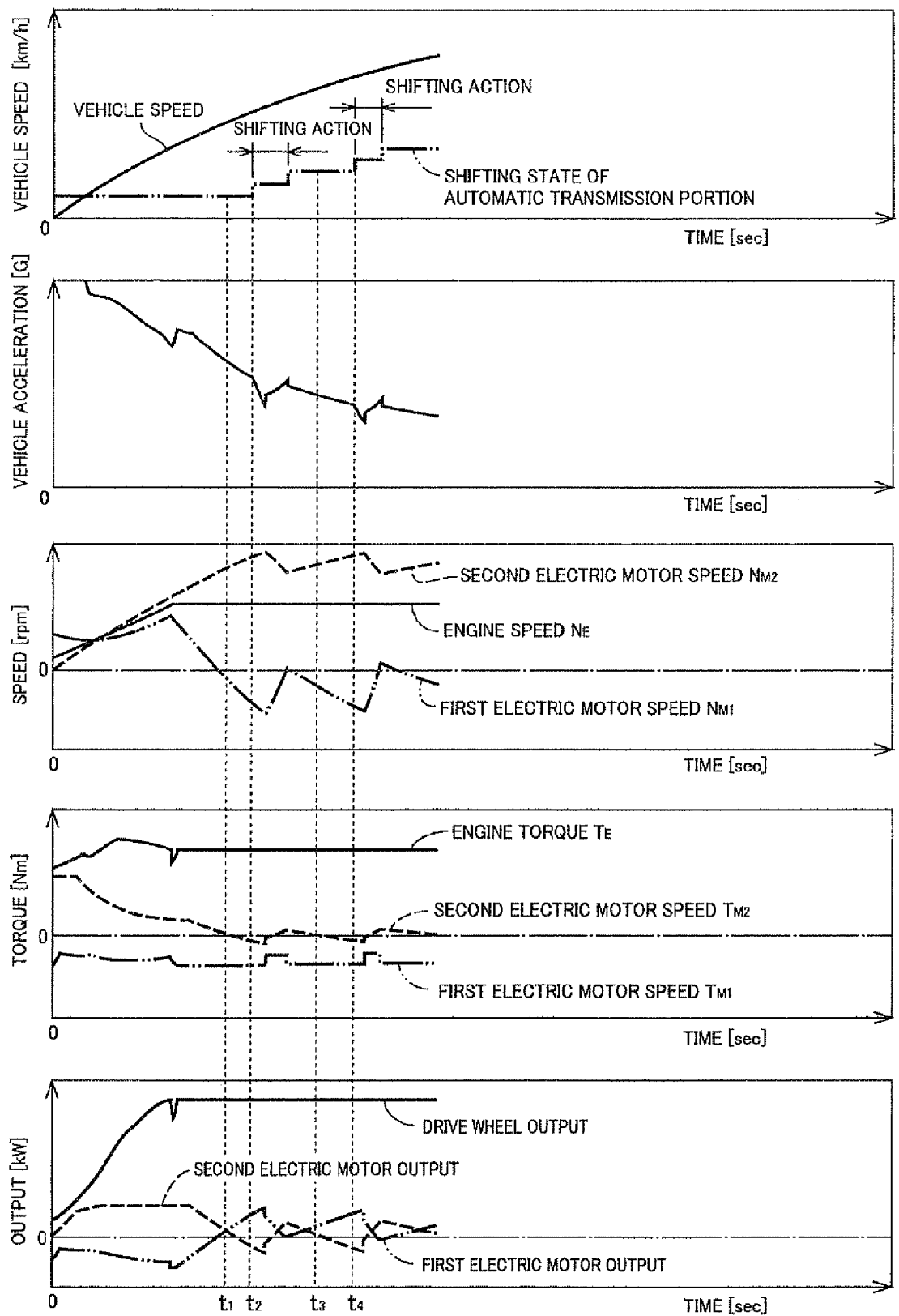
FIG. 15 is a time chart indicating the shift-up actions of the automatic transmission portion as a result of a rise of the vehicle speed when the working fluid temperature is extremely low before the warm-up operation of the automatic transmission, in the first embodiment wherein the shifting-up boundary lines of FIG. 7 are changed according to the shifting response such that the moment of determination to perform the shift-up actions is advanced as the shifting response is reduced.

FIGS. 14 and 15 are time charts indicating shift-up actions of the automatic transmission portion as a result of a rise of the vehicle speed when the working fluid temperature is extremely low before a warm-up operation of the automatic transmission. The time chart of FIG. 14 shows the shift control in the prior art wherein the nominal shift-up boundary lines of FIG. 7 (shifting-point vehicle speed values defined by the shift-up boundary lines) are not changed according to a change of the shifting response of the automatic transmission portion 20 determined by the detected working fluid temperature $\text{TEMP}_{ATF}$. On the other hand, the time chart of FIG. 15 shows the shift control according to the present embodiment wherein the nominal shift-up boundary lines are changed according to the shifting response such that the moment of determination to perform the shift-up actions is advanced as the shifting response is reduced.

In the case of FIG. 14, the output of the first electric motor M1 is limited during time periods immediately before the shift-up actions, more precisely, during a time period from a point of time t1 to a point of time t2 and a time period from a point of time t3 to a point of time t4, since the shifting response of the automatic transmission portion 20 is considerably lower than the value after the warm-up operation of the vehicle. That is, the output of the first electric motor M1 (indicated by two-dot chain line) is not increased during the time period between the points of time t1 and t2 and the time period between the points of time t3 and t4, in spite of a continuous rise of the vehicle speed V. Consequently, the vehicle acceleration and the output of the drive wheels 38 are reduced during those two time periods, as indicated by hatched lines, so that the shift-up actions as felt by the vehicle operator are deteriorated.

In the case of FIG. 15, on the other hand, the output of the first electric motor M1 (indicated by two-dot chain line) is increased during the time period between the points of time t1 and t2 and the time period between the points of time t3 and t4, as the vehicle speed V is raised. Consequently, the reduction of the vehicle acceleration and the output of the drive wheels 38 during those time periods as indicated by the hatched lines in FIG. 14 is prevented, so that the deterioration of the shift-up actions as felt by the vehicle operator due to the low shifting response of the automatic transmission portion 20 can be avoided.

(A3) Generally, the running resistance of the vehicle increases with an increase of the running speed V, so that the engine torque $T_E$ increases with the increase of the vehicle running speed V, and the first electric motor torque $T_{M1}$ which is the reaction torque corresponding to the engine torque $T_E$ increases in the direction opposite to the direction of change of the engine torque $T_E$, that is, in the negative direction. Further, a permissible range of a change of the first electric motor speed $N_{M1}$ is narrowed toward zero with a change of the first electric motor torque $T_{M1}$ from zero in the negative direction, so that the amount of margin RM1 to the operable limit $LT_{M1}$ of the operable zone $A_{M1}$ of FIG. 8 tends to decrease as the first electric motor torque $T_{M1}$ changes from zero in the negative direction. Accordingly, it is considered that there is a high possibility at a relatively high value of the vehicle running speed V that the output of the first electric motor M1 is limited as a result of a large amount of change of the first electric motor speed $N_{M1}$ before the moment of completion of the shifting action of the automatic transmission portion 20 due to the low shifting response. In the present embodiment, the shifting-point changing portion 74 is configured to increase the amount of change of the shifting point (amount of movement of the nominal shifting boundary lines of FIG. 7) at a given value of the shifting response of the automatic transmission portion 20, with an increase of the vehicle speed V, so that the amount of change of the shifting point at the same shifting response of the automatic transmission portion 20 is increased with an increase of the vehicle speed V, that is, with an increase of the first electric motor torque $T_{M1}$ in the negative direction. Accordingly, the possibility of the output limitation of the first electric motor M1 can be reduced, whereby the deterioration of the shifting action as felt by the vehicle operator due to the low shifting response at the relatively low working fluid temperature $TEMP_{ATF}$ can be effectively reduced, at the different values of the vehicle speed V.

(A4) The shifting-point changing portion 74 changes the shifting-point vehicle speed values defining the shift-down and shift-up boundary lines, by the determined shifting-point vehicle-speed changing width $W_{VS}$, namely, moves or shifts the nominal shift-down and shift-up boundary lines of FIG. 7 in the direction of the horizontal axis of the coordinate system of the shifting boundary line map. so that the first electric motor speed $N_{M1}$ represented by the first electric motor operating point $P_{M1}$ (e.g., $P1_{M1}$ indicated in FIG. 8) at the time of the determination to perform the shifting action of the automatic transmission portion 20 according to the changed shift-down or shift-up boundary lines can be changed according to the distance of movement of the nominal shift-down or shift-up boundary lines. As a result, the determination to perform the shifting action of the automatic transmission portion 20 is made at the first electric motor operating point $P_{M1}$ having an amount of margin to the operable limit $LT_{M1}$, which amount increases with a decrease of the shifting response of the automatic transmission portion, whereby the possibility of the output limitation of the first electric motor M1 can be reduced.

(A5) The automatic transmission portion 20 is shifted by the frictional coupling devices in the form of the clutches C and brakes B which are hydraulically operated by the working fluid, the temperature $TEMP_{ATF}$ of which determines or reflects the shifting response of the automatic transmission portion 20. The shifting-point changing portion 74 uses the map of FIG. 10 to easily determine the shifting response of the automatic transmission portion 20 by detecting the working fluid temperature $TEMP_{ATF}$, since the shifting response changes with a change of the viscosity of the working fluid, which changes depending upon the working fluid temperature $TEMP_{ATF}$.

Then, a second embodiment of this invention will be described. In the second embodiment, the same reference signs as used in the first embodiment will be used to identify the corresponding elements.

Figure 16:
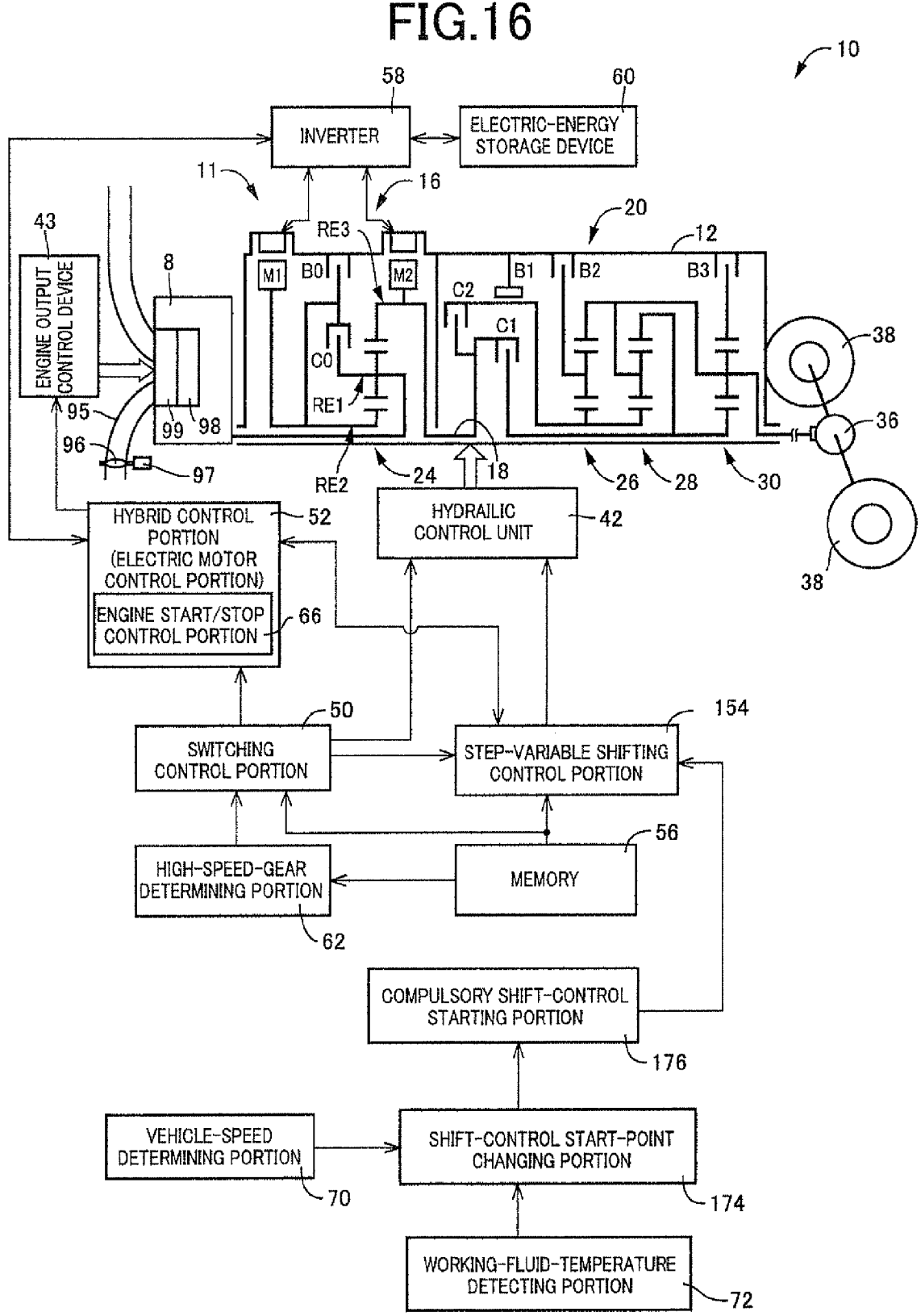
FIG. 16 is a functional block diagram corresponding to that of FIG. 6, illustrating major control functions of the electronic control device of FIG. 4 according to a second embodiment of this invention.

Referring to the functional block diagram of FIG. 16, there will be described major control functions of the electronic control device 40 configured according to the second embodiment of this invention. The second embodiment is different from the first embodiment in that a step-variable shifting control portion 154 and a shift-control start-point changing portion 174 are provided in the second embodiment in place of the step-variable shifting control portion 54 and the shifting-point changing portion 74 provided in the first embodiment, and a compulsory shift-control starting portion 176 is additionally provided in the second embodiment.

In the first embodiment, the nominal shifting boundary lines (nominal shift-up and shift-down boundary lines) of FIG. 7 are moved or shifted such that the moment at which the determination to perform the shifting action of the automatic transmission portion 20 is made is advanced as the shifting response of the automatic transmission portion 20 is reduced, so that the amount of margin of the first electric motor operating point $P1_{M1}$ (indicated in FIG. 8) with respect to the operable limit $LT_{M1}$ (also indicated in FIG. 8) at the moment of the determination to perform the shifting action according to the moved shifting boundary lines is increased. In the present second embodiment, on the other hand, the determination to actually perform the shifting action is made irrespective of the position of the operating point of the vehicular power transmitting system 10 with respect to the shifting boundary lines of FIG. 7, when the first electric motor operating point $P_{M1}$ has reached a shift-control start point $PM_{AT}$ indicated in FIG. 8. In this case, the nominal shifting boundary lines (shifting boundary line map) of FIG. 7 (used in the first embodiment when the working fluid temperature $TEMP_{ATF}$ has the steady-state or normal-state value after completion of the warm-up operation of the vehicle) remain unchanged, and the shift-control start point $PM_{AT}$ is determined or positioned with respect to its reference point positioned at the first electric motor operating point $P1_{M1}$ at which the determination to perform the shifting action is made in the first embodiment according to the nominal shifting boundary lines of FIG. 7. In the second embodiment, the determination as to whether the actual shifting action of the automatic transmission portion 20 should take place is made according to not only the nominal shifting boundary lines but also the shift-control start point $PM_{AT}$. In this second embodiment, too, the first electric motor operating point $P_{M1}$ at which the determination to actually perform the shifting action is made is moved such that the amount of margin of the operating point $P_{M1}$ with respect to the operable limit $LT_{M1}$ (indicated in FIG. 8) is increased with a decrease of the shifting response of the automatic transmission portion 20.

Figure 17:
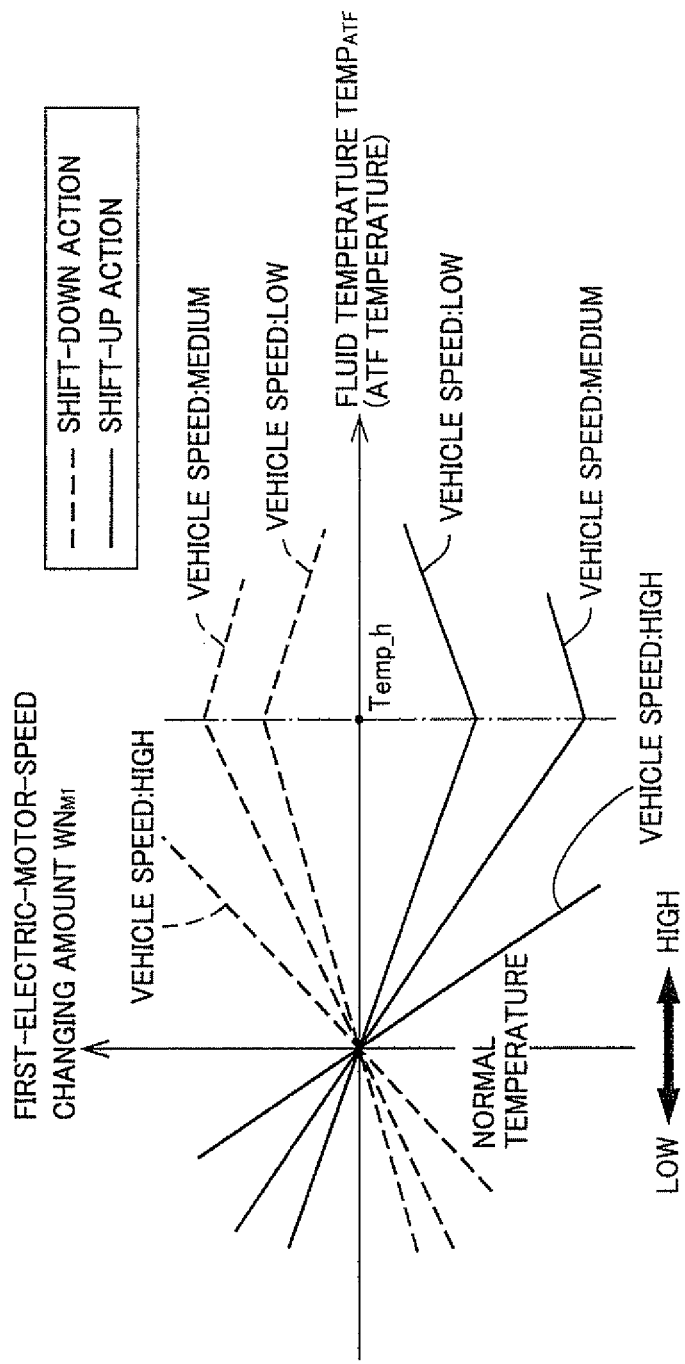
FIG. 17 is a view indicating a map used by the electronic control device of FIG. 4 for determining a first-electric-motor-speed changing amount on the basis of the vehicle speed and the working fluid temperature, in a two-dimensional coordinate system in which the working fluid temperature and the first-electric-motor-speed changing amount are taken along respective horizontal and vertical axes.

FIG. 17 indicates a map used by the shift-control start-point changing portion 174 for determining a first electric motor speed changing amount $WN_{M1}$ on the basis of the vehicle speed V and the working fluid temperature $TEMP_{ATF}$, the map being defined in the two-dimensional coordinate system in which the working fluid temperature $TEMP_{ATF}$ and the shifting-point vehicle-speed changing width $WN_{M1}$ are taken along the respective horizontal and vertical axes. The first electric motor speed changing amount $WN_{M1}$ determines an amount of change of the first electric motor speed $N_{M1}$ in the direction of the horizontal axis of the coordinate system of FIG. 17 with respect to the reference point of the shift-control start point $PM_{AT}$ at which the determination to perform the shifting action is made at the steady-state value of the working fluid temperature $TEMP_{ATF}$ after completion of the warm-up operation of the automatic transmission portion 20. According to the lines of relationship of FIG. 17 between the working fluid temperature $TEMP_{ATF}$ and the first electric motor speed changing amount $WN_{M1}$, the changing amount $WN_{M1}$ is zero when the working fluid temperature $TEMP_{ATF}$ has the normal-state value. The lines of relationship of FIG. 17 are obtained by experimentation, so as to reduce an amount of influence of a change of the working fluid temperature $TEMP_{ATF}$ on the path of movement of the first electric motor operating point $P_{M1}$ indicated in FIG. 8, more specifically, so as to reduce an amount of change of the margin RM1 of the first electric motor operating point $P_{M1}$ with respect to the operable limit $LT_{M1}$, which is caused by a change of the working fluid temperature $TEMP_{ATF}$. According to the lines of relationship of FIG. 17 between the temperature $TEMP_{ATF}$ and the amount $WN_{M1}$, the absolute value of the amount $WN_{M1}$ increases with an increase of the vehicle speed V. Further, the lines of relationship of FIG. 17 are determined such that the first electric motor speed changing amount $WN_{M1}$ for the shift-down actions (indicated by broken lines) decreases with a decrease of the working fluid temperature $TEMP_{ATF}$ from the critical value Temp_h, while the first electric motor speed changing amount $WN_{M1}$ for the shift-up action (indicated by solid lines) increases with the decrease of the working fluid temperature $TEMP_{ATF}$ from the critical value Temp_h, where the sign of the positive and negative signs of the first electric motor speed changing amount $WN_{M1}$ are taken into consideration. Further, the first electric motor speed changing amount $WN_{M1}$ for the shift-down actions decreases toward zero with an increase of the working fluid temperature $TEMP_{ATF}$ from the critical value Temp_h, while the first electric motor speed changing amount $WN_{M1}$ for the shift-up action increases toward zero with the increase of the working fluid temperature $TEMP_{ATF}$ from the critical value Temp_h, Thus, the lines of relationship of FIG. 17 have opposite directions of inclination on the respective opposite sides of the critical value Temp_h of the working fluid temperature $TEMP_{ATF}$, for the same reason as described above with respect to the map of FIG. 10. Accordingly, the lines of relationship of FIG. 17 are determined such that the first electric motor speed changing amount $WN_{M1}$ for the shift-up actions (indicated by the solid lines) increases in the positive direction with a decrease of the shifting response of the automatic transmission portion 20 as the working fluid temperature $TEMP_{ATF}$ is lowered, while the first electric motor speed changing amount $WN_{M1}$ for the shift-down actions (indicated by the broken lines) increases in the negative direction with a decrease of the shifting response of the automatic transmission portion 20 as the working fluid temperature $TEMP_{ATF}$ is lowered.

Figure 18:
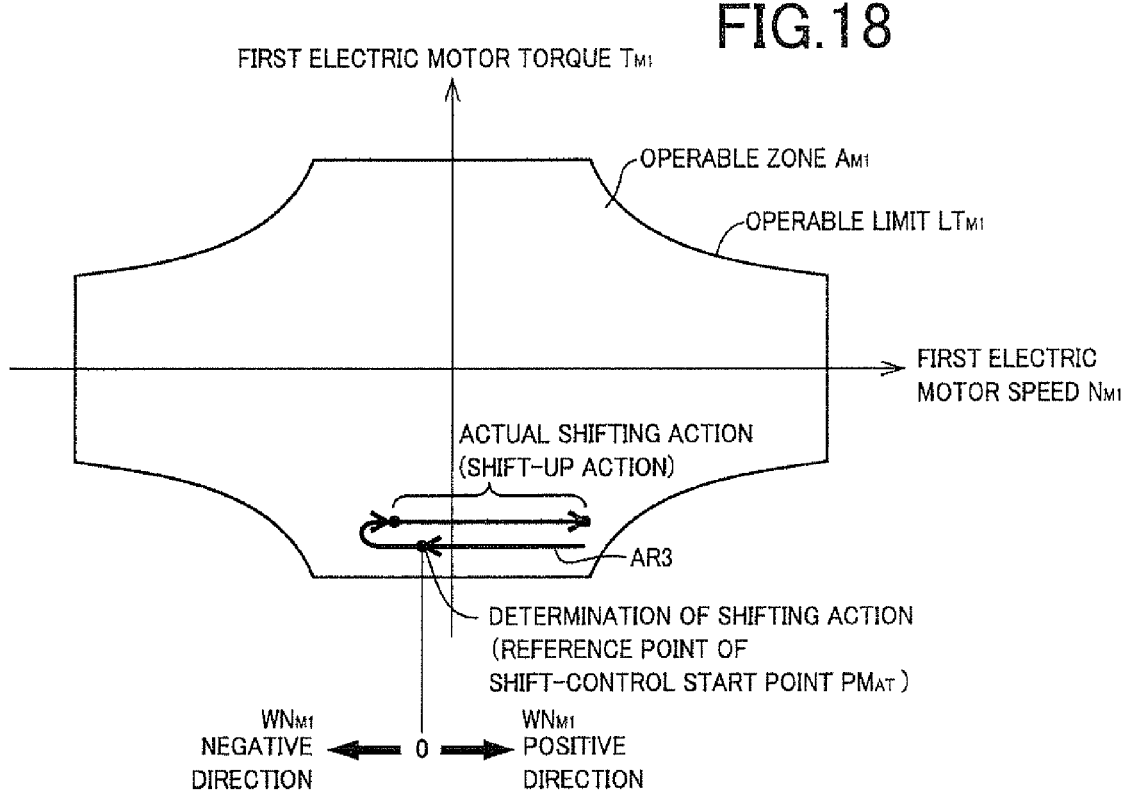
FIG. 18 is a view illustrating a movement of a shift-control start point used for determination of a shifting action of the automatic transmission portion of the vehicular power transmitting system of FIG. 1 in the operable zone of the first electric motor of FIG. 8, where the shifting action is a shift-up action.

FIG. 18 is a view for explaining a manner of determination of the shift-control start point $PM_{AT}$ within the operable range $A_{M1}$ of the first electric motor 1141. At this shift-control start point $PM_{AT}$, the determination to actually perform the shift-up action of the automatic transmission portion 20 is made. The coordinate system of FIG. 18, and the operable zone $A_{M1}$ and operable limit $LT_{M1}$ indicated in FIG. 18 are the same as described above with respect to FIG. 8. The first electric motor operating point $P_{M1}$ takes a path AR3 indicated in FIG. 18, in the case of the shift-up action of the automatic transmission portion 20.

Referring back to FIG. 16, the shift-control start-point changing portion 174 is configured to change the shift-control start point $PM_{AT}$ at which the automatic transmission portion 20 is commanded to initiate the shift-up and shift-down actions, such that the moments of determination to actually perform the shift-up and shift-down actions are advanced as the shifting response of the automatic transmission portion 20 is reduced. The shift-control start-point changing portion 174 is further configured to increase the amount of change of the shift-control start point $PM_{AT}$ at the same shifting response of the automatic transmission portion 20, with an increase of the vehicle speed V. Described in detail referring to FIG. 17, the shift-control start-point changing portion 174 stores lines of relationship among the vehicle speed V, the working fluid temperature $TEMP_{ATF}$ and the above-indicated first electric motor speed changing amount $WN_{M1}$. The shift-control start-point changing portion 174 selects one of a plurality of lines of relationship between the working fluid temperature $TEMP_{ATF}$ and the first electric motor speed changing amount $WN_{M1}$, which one line of relationship corresponds to the range of the vehicle speed V determined by the vehicle-speed determining portion 70. Described in detail by reference to FIG. 17, the shift-control start-point changing portion 174 selects the line of relationship corresponding to the low range of the vehicle speed V when the vehicle-speed determining portion 70 determines that the detected vehicle speed V is in the low range (indicated as "LOW" in FIG. 17). The shifting-point changing portion 74 selects the line of relationship corresponding to the medium range of the vehicle speed V when the vehicle-speed determining portion 70 determines that the detected vehicle speed V is in the medium range (indicated as "MEDIUM" in FIG. 17), and selects the line of relationship corresponding to the high range of the vehicle speed V when the vehicle-speed determining portion 70 determines that the detected vehicle speed V is in the high range (indicated as "HIGH" in FIG. 17). Then, the shifting-point changing portion 74 determines the first electric motor speed changing amount $WN_{M1}$ on the basis of the working fluid temperature $TEMP_{ATF}$ detected by the working-fluid-temperature detecting portion 72, and according to the selected line of relationship between the temperature $TEMP_{ATF}$ and the changing amount $WN_{M1}$. The first electric motor operating point $P1_{M1}$ at which the determination to perform the shifting action of the automatic transmission portion 20 is made on the basis of the required output torque $T_{OUT}$ (operating amount Acc of the accelerator pedal) and the vehicle speed V and according to the nominal shifting boundary lines of FIG. 7 is determined as the reference point (indicated in FIG. 18) of the shift-control start point $PM_{AT}$. The shift-control start-point changing portion 174 stores data indicative of this reference point, and moves or shifts the shift-control start point $PM_{AT}$ with respect to the reference point by the determined first electric motor speed changing amount $WN_{M1}$, in the direction of change of the first electric motor speed changing amount $WN_{M1}$ along the axis of the coordinate system of FIG. 17. Described more specifically, the shift-control start-point changing portion 174 moves the shift-control start point $PM_{AT}$ in the positive direction of the first electric motor speed $N_{M1}$ when the first electric motor speed changing amount $WN_{M1}$ is a positive value, and moves the shift-control start point $PM_{AT}$ in the negative direction of the first electric motor speed $N_{M1}$ when the first electric motor speed changing amount $WN_{M1}$ is a negative value. Namely, the lines of relationship of FIG. 17 are determined such that the first electric motor speed changing amount $WN_{M1}$ for the shift-up actions (indicated by the solid lines) increases in the positive direction with a decrease of the shifting response of the automatic transmission portion 20 as the working fluid temperature $TEMP_{ATF}$ is lowered, while the first electric motor speed changing amount $WN_{M1}$ for the shift-down actions (indicated by the broken lines) increases in the negative direction with a decrease of the shifting response of the automatic transmission portion 20 as the working fluid temperature $TEMP_{ATF}$ is lowered. Thus, the shift-control start-point changing portion 174 moves or shifts the shift-control start point $PM_{AT}$ such that the moment at which the first electric motor operating point $P_{M1}$ reaches the shift-control start point $PM_{AT}$ is advanced with the decrease of the shifting response of the automatic transmission portion 20.

Figure 19:
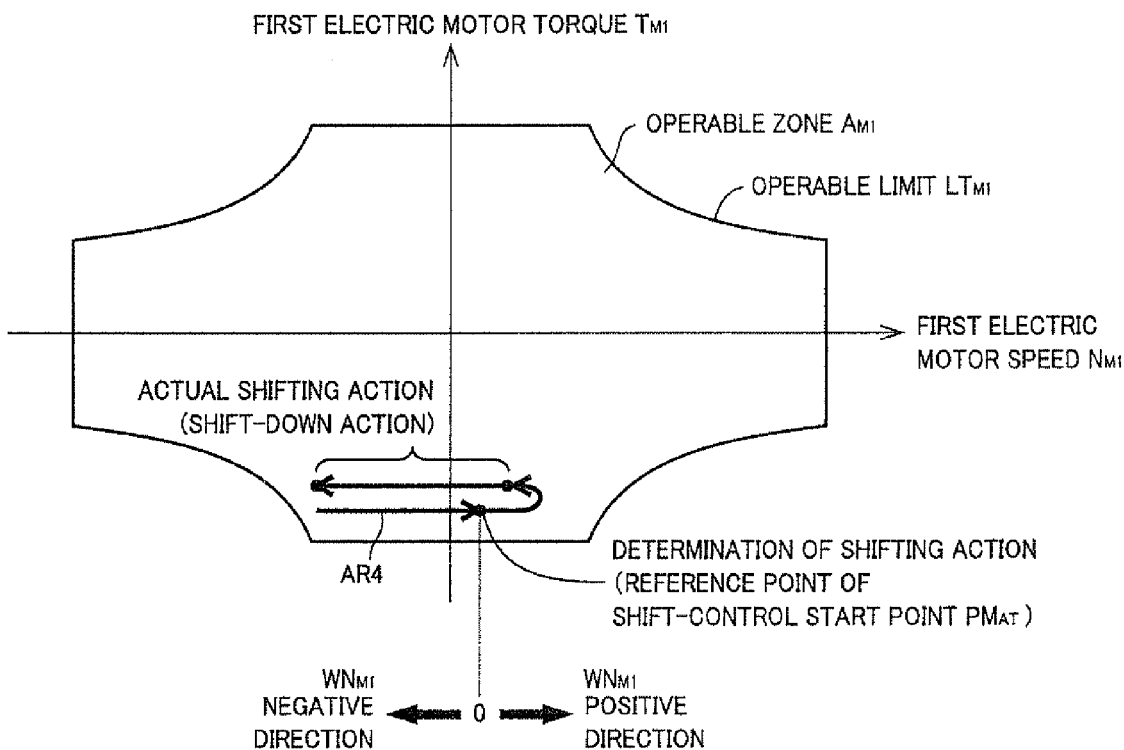
FIG. 19 is a view illustrating a movement of the shift-control start point used for determination of the shifting action of the automatic transmission portion of the vehicular power transmitting system of FIG. 1 in the operable zone of the first electric motor of FIG. 8, where the shifting action is a shift-down action.

While FIG. 18 illustrates the path of movement of the shift-control start point $PM_{AT}$ used for the determination of the shift-up actions of the automatic transmission portion, FIG. 19 illustrates a path of movement of the shift-control start point $PM_{AT}$ used for determination of the shift-down actions of the automatic transmission portion 20. Preferably, the shift-control start-point changing portion 174 changes or determines the shift-control start point $PM_{AT}$ according to the lines of relationship of FIG. 17 during running of the vehicle in the engine drive mode while the differential portion 11 is placed in the non-locked state.

The compulsory shift-control starting portion 176 detects the first electric motor speed $N_{M1}$, and detects the first electric motor torque $T_{M1}$ on the basis of the electric current applied to the first electric motor M1, for example. Then, the compulsory shift-control starting portion 176 first electric motor operating point PM1 on the basis of the detected first electric motor speed $N_{M1}$ and torque $T_{M1}$ determines whether the first electric motor operating point $P_{M1}$ has reached the shift-control start point $PM_{AT}$ (indicated in FIGS. 18 and 19) determined by the shift-control start-point changing portion 174. When an affirmative determination is made by the compulsory shift-control starting portion 176, that is, when the first electric motor operating point $P_{M1}$ has reached the shift-control start point $PM_{AT}$, the compulsory shift-control starting portion 176 determines that the automatic transmission portion 20 should perform the shifting action, and commands the step-variable shifting control portion 154 to command the hydraulic control unit 42 to engage and release the appropriate ones of the clutches C and brakes B, for performing the determines shifting action of the automatic transmission portion 20. When the compulsory shift-control starting portion 176 determines that the first electric motor operating point $P_{M1}$ has not yet reached the shift-control start point $PM_{AT}$, the compulsory shift-control starting portion 176 does not make the determination to actually perform the shifting action, and does not command the step-variable shifting control portion 154 to command the hydraulic control unit 42 to perform the shifting action.

Like the step-variable shifting control portion 54 in the first embodiment, the step-variable shifting control portion 154 determines whether a shifting action of the automatic transmission 20 should take place, on the basis of the vehicle condition represented by the vehicle speed V and the required output torque $T_{OUT}$ of the automatic transmission portion 20 and according to the nominal shifting boundary lines of FIG. 7. Unlike the step-variable shifting control portion 54 in the first embodiment, however, the step-variable shifting control portion 154 is commanded by the compulsory shift-control starting portion 176 to command the hydraulic control unit 42 to actually perform the shifting action of the automatic transmission portion 20, irrespective of the determination according to the nominal shifting boundary lines of FIG. 7, that is, in spite of the negative determination to perform the shifting action according to the nominal shifting boundary lines, namely, even when the determination that the shifting action should not take place is made according to the nominal shifting boundary lines.

Figure 20:
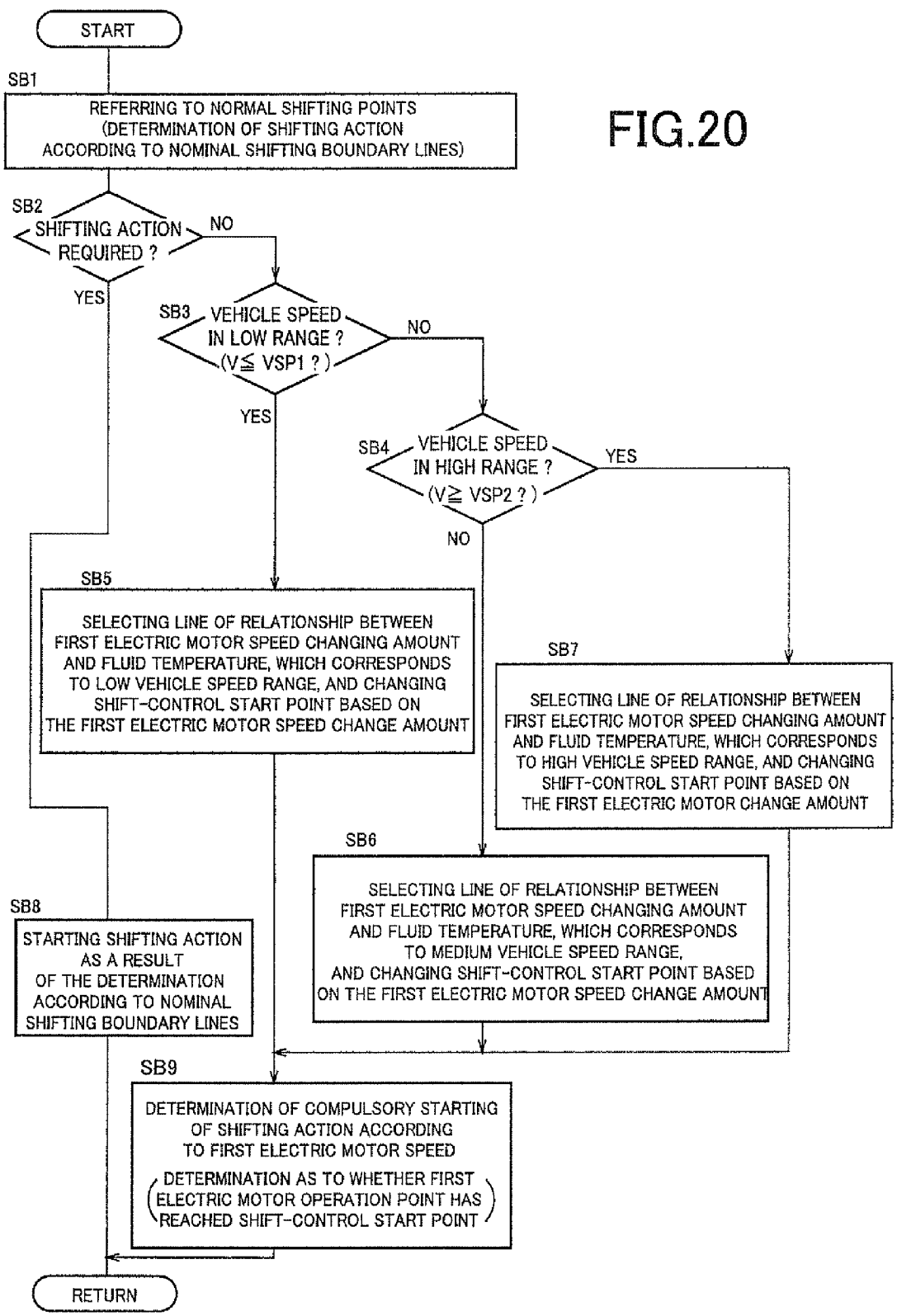
FIG. 20 is a flow chart corresponding to that of FIG. 13, illustrating a shift control routine executed by the electronic control device of FIG. 4 in the second embodiment to control the automatic transmission portion so as to prevent deterioration of shifting actions as felt by the vehicle operator at a low shifting response of the automatic transmission portion.

Referring to the flow chart of FIG. 20 corresponding to that of FIG. 13, there will be described a shift control routine executed by the electronic control device 40 to control the automatic transmission portion 20 so as to prevent deterioration of the shifting actions as felt by the vehicle operator when the shifting response of the automatic transmission portion 20 is relatively low. This shift control routine is repeatedly executed with an extremely short cycle time of about several milliseconds to several tens of milliseconds. Preferably, the shift control routine of FIG. 20 is executed during running of the vehicle in the engine drive mode while the differential portion 11 is placed in the non-locked state. Steps SB3 and SB4 are identical with the steps SA1 and SA2 of the shift control routine of FIG. 13. A difference of the shift control routine of FIG. 20 with respect to that of FIG. 13 will be described.

The shift control routine of FIG. 20 is initiated with step SB1 corresponding to the step-variable shifting control portion 154, to determine whether a shifting action of the automatic transmission portion 20 should take place, on the basis of the vehicle condition represented by the required output torque $T_{OUT}$ (or accelerator pedal operating amount $A_{CC}$) and the vehicle speed V and according to the nominal shifting boundary lines of FIG. 7, Step SB1 is followed by step SB2.

In step SB2 also corresponding to the step-variable shifting control portion 154, a determination as to whether the affirmative determination is obtained in step SB1. If an affirmative determination is obtained in step SB2, that is, when the determination to perform the shifting action of the automatic transmission portion 20 is made in step SB1, the control flow goes to step SB3. If a negative determination is obtained in step SB2, the control flow goes to sep SB3.

If the affirmative determination is obtained in step SB3, that is, the control flow goes to step SB5 to detect the working fluid temperature $TEMP_{ATF}$ of the automatic transmission portion 20, select the line of relationship between the working fluid temperature $TEMP_{ATF}$ and the first electric motor speed changing amount $WN_{M1}$, which corresponds to the low range of the vehicle speed V, and then determine the first electric motor speed changing amount $WN_{M1}$ on the basis of the detected working fluid temperature $TEMP_{ATF}$ and according to the selected line of relationship. Then, the shift-control start point $PM_{AT}$ is moved or shifted with respect to the stored reference point by the determined first electric motor speed changing amount $WN_{M1}$, in the direction of change of the first electric motor speed $N_{M1}$ (in the direction of the horizontal axis of FIGS. 18 and 19). Thus, the shift-control start point $PM_{AT}$ of FIGS. 18 and 19 is changed in step SB5 on the basis of the first electric motor speed changing amount $WN_{M1}$ determined according to the line of relationship of FIG. 17 between the temperature $TEMP_{ATF}$ and the changing amount $WN_{M1}$, which line of relationship corresponds to the low range of the vehicle speed V. Step SB5 is followed by step SB9.

If the negative determination is obtained in step SB4, the control flow goes to step SB6 to detect the working fluid temperature $TEMP_{ATF}$ of the automatic transmission portion 20, select the line of relationship between the working fluid temperature $TEMP_{ATF}$ and the first electric motor speed changing amount $WN_{M1}$, which corresponds to the medium range of the vehicle speed V, and then determine the first electric motor speed changing amount $WN_{M1}$ on the basis of the detected working fluid temperature $TEMP_{ATF}$ and according to the selected line of relationship. Then, the shift-control start point $PM_{AT}$ is moved or shifted with respect to the stored reference point by the determined first electric motor speed changing amount $WN_{M1}$, in the direction of change of the first electric motor speed $N_{M1}$ (in the direction of the horizontal axis of FIGS. 18 and 19). Thus, the shift-control start point $PM_{AT}$ of FIGS. 18 and 19 is changed in step SB6 on the basis of the first electric motor speed changing amount $WN_{M1}$ determined according to the line of relationship of FIG. 17 between the temperature $TEMP_{ATF}$ and the changing amount $WN_{M1}$, which line of relationship corresponds to the medium range of the vehicle speed V. Step SB6 is followed by step SB9.

If the affirmative determination is obtained in step SB4, the control flow goes to step SB7 to detect the working fluid temperature $TEMP_{ATF}$ of the automatic transmission portion 20, select the line of relationship between the working fluid temperature $TEMP_{ATF}$ and the first electric motor speed changing amount $WN_{M1}$, which corresponds to the high range of the vehicle speed V, and then determine the first electric motor speed changing amount $WN_{M1}$ on the basis of the detected working fluid temperature $TEMP_{ATF}$ and according to the selected line of relationship. Then, the shift-control start point $PM_{AT}$ is moved or shifted with respect to the stored reference point by the determined first electric motor speed changing amount $WN_{M1}$, in the direction of change of the first electric motor speed $N_{M1}$ (in the direction of the horizontal axis of FIGS. 18 and 19). Thus, the shift-control start point $PM_{AT}$ of FIGS. 18 and 19 is changed in step SB7 on the basis of the first electric motor speed changing amount $WN_{M1}$ determined according to the line of relationship of FIG. 17 between the temperature $TEMP_{ATF}$ and the changing amount $WN_{M1}$, which line of relationship corresponds to the high range of the vehicle speed V. Step SB7 is followed by step SB9.

In step SB8 corresponding to the step-variable shifting control portion 154, the hydraulic control unit 42 is commanded to engage and release the appropriate ones of the clutches C and brakes B to perform the shifting action of the automatic transmission portion 20, according to the determination in step SB1.

Steps SB5-SB7 are followed by step SB9 corresponding to the step-variable shifting control portion 154 and compulsory shift-control starting portion 176, to determine the first electric motor operating point $P_{M1}$ on the basis of the first electric motor speed $N_{M1}$ and torque $T_{M1}$, and to determine whether the first electric motor operating point $P_{M1}$ has reached the shift-control start point $PM_{AT}$ determined in steps SB5-SB7. If the affirmative determination is obtained, that is, the first electric motor operating point $P_{M1}$ has reached the shift-control start point $PM_{AT}$, the determination to perform the actual shifting action of the automatic transmission portion 20 is made, to command the hydraulic control unit 42 to engage and release the appropriate ones of the clutches C and brakes B, for starting the determined shifting action. If the negative determination is made, that is, if the first electric motor operating point $P_{M1}$ has not reached the shift-control start point $PM_{AT}$, the hydraulic control unit 42 is not commanded to perform the shifting action.

The control apparatus in the form of the electronic control device 40 configured according to the present second embodiment of this invention has the following advantages:

(B1) The shift-control start-point changing portion 174 is configured to determine the change or determine the shift-control start point $PM_{AT}$ (at which the determination to actually perform the shift-up or shift-down action of the automatic transmission portion 20) according to the shifting response of the automatic transmission portion 20. The compulsory shift-control starting portion 176 is configured to make the determination to perform the shifting action of the automatic transmission portion 20 when it is determined that the first electric motor operating point $P_{M1}$ has reached the shift-control start point $PM_{AT}$. In this case, the compulsory shift-control starting portion 176 commands the step-variable shifting control portion 154 to command the hydraulic control unit 42 to engage and release the appropriate ones of the clutches C and brakes B, irrespective of the determination according to the determination as to whether the shifting action should take place according to the nominal shifting boundary lines of FIG. 7. Thus, the shift-control start-point changing portion 174 is configured to change the shift-control start point $PM_{AT}$ according to the shifting response of the automatic transmission portion 20, so that the determination as to whether the shifting action of the automatic transmission portion 20 should actually take place can be made while taking account of a possibility of a time delay of the shifting action due to a low degree of the shifting response of the automatic transmission portion 20, making it possible to prevent or reduce the deterioration or reduction of the shifting action as felt by the vehicle operator due to the low shifting response of the automatic transmission portion 20.

(B2) The shift-control start-point changing portion 174 changes the shift-control start point $PM_{AT}$ (at which the determination to actually perform the shifting action (shift-up or shift-down action) of the automatic transmission portion 20 is made), such that the moment of the determination to perform the shifting action of the automatic transmission portion 20 is advanced as the shifting response of the automatic transmission portion 20 is reduced. When the first electric motor operating point $P_{M1}$ of the first electric motor M1 has reached shift-control start point $PM_{AT}$, the determination to perform the shifting action is made irrespective of the determination as to whether the shifting action should take place according to the nominal shifting boundary lines of FIG. 7, and the hydraulic control unit 42 is commanded to perform the shifting action. Accordingly, the time delay of the shifting action due to the low shifting response of the automatic transmission portion 20 is reduced by the advancement of the moment at which the determination to perform the shifting action is made. The shift-control start-point changing portion 174 can prevent a change of the path of movement AR1 (indicated by the solid line in FIG. 8) of the first electric motor operating point $P_{M1}$ immediately before or during the shifting action of the automatic transmission portion 20 while the shifting response is low. Accordingly, it is possible to prevent the limitation of the output of the first electric motor M1 during the shifting action of the automatic transmission portion 20, which would take place when the first electric motor operating point $P_{M1}$ reaches the operable limit $LT_{M1}$ as indicated in FIG. 8. Accordingly, the deterioration of the shifting action as felt by the vehicle operator due to the low shifting response can be prevented or avoided.

(B3) Generally, the running resistance of the vehicle increases with an increase of the running speed V, so that the first electric motor torque $T_{M1}$ increases in the negative direction with the increase of the vehicle running speed V, Further, a permissible range of a change of the first electric motor speed $N_{M1}$ is narrowed toward zero with a change of the first electric motor torque $T_{M1}$ from zero in the negative direction. Accordingly, it is considered that there is a high possibility at a relatively high value of the vehicle running speed V that the output of the first electric motor M1 is limited as a result of a large amount of change of the first electric motor speed $N_{M1}$ before the moment of completion of the shifting action of the automatic transmission portion 20 due to the low shifting response. In the present second embodiment, the shift-control start-point changing portion 174 is configured to increase the amount of change of the shift-control start point $PM_{AT}$ at a given value of the shifting response of the automatic transmission portion 20, with an increase of the vehicle speed V, so that the amount of change of the shift-control start point at the same shifting response of the automatic transmission portion 20 is increased with an increase of the vehicle speed V, that is, with an increase of the first electric motor torque $T_{M1}$ in the negative direction. Accordingly, the possibility of the output limitation of the first electric motor M1 can be reduced, whereby the deterioration of the shifting action as felt by the vehicle operator due to the low shifting response at the relatively low working fluid temperature $TEMP_{ATF}$ can be effectively reduced, at the different values of the vehicle speed V. increase of the running speed, that is, with an increase of the output torque (B4) The automatic transmission portion 20 is shifted by the frictional coupling devices in the form of the clutches C and brakes B which are hydraulically operated by the working fluid, the temperature $TEMP_{ATF}$ of which determines or reflects the shifting response of the automatic transmission portion 20. The shift-control start-point changing portion 174 uses the map of FIG. 17 to easily determine the shifting response of the automatic transmission portion 20 by detecting the working fluid temperature $TEMP_{ATF}$, since the shifting response changes with a change of the viscosity of the working fluid, which changes depending upon the working fluid temperature $TEMP_{ATF}$.

While the preferred embodiments of this invention have been described in detail by reference to the accompanying drawings, for illustrative purpose only, it is to be understood that the present invention may be embodied with various changes and modifications which may occur to those skilled in the art.

For example, the shifting-point vehicle speed changing width $W_{VS}$ and the first electric motor speed changing amount $WN_{M1}$ need not be changed in three steps according to the respective three vehicle speed ranges "LOW", "MEDIUM" and "HIGH" in the illustrated embodiments of FIGS. 10 and 17, and may be changed continuously according to the detected vehicle speed V.

In the illustrated first embodiment of FIG. 10, the shifting-point vehicle speed changing width $W_{VS}$ is continuously changed with a change of the working fluid temperature $TEMP_{ATF}$. However, the shifting-point vehicle speed changing width $W_{VS}$ may be changed in steps according to the working fluid temperature $TEMP_{ATF}$. Similarly, the first electric motor speed changing amount $WN_{M1}$ is continuously changed with the change of the working fluid temperature $TEMP_{ATF}$. However, the first electric motor speed changing amount $WN_{M1}$ may be changed in steps according to the working fluid temperature $TEMP_{ATF}$ according to the working fluid temperature $TEMP_{ATF}$.

While the shifting response of the automatic transmission portion 20 is determined on the basis of the working fluid temperature $TEMP_{ATF}$ in the illustrated first and second embodiments, the shifting response may be determined on the basis of the viscosity or any other physical quantity of the working fluid.

In the illustrated second embodiment, the shift-control start point $PM_{AT}$ of the first electric motor M1 is moved or shifted with respect to the reference point (FIG. 18) of the first electric motor operating point $P1_{M1}$ at which the determination to perform the shifting action of the automatic transmission portion 20 is made according to the nominal shifting boundary lines of FIG. 7. However, the reference point (FIG. 18) need not be positioned at the first electric motor operating point $P1_{M1}$ at which the determination is made according to the nominal shifting boundary lines of FIG. 7. Preferably, the reference point is set such that the first electric motor operating point $P1_{M1}$ reaches the reference point at the moment of the above-indicated determination or at a point of time later than the moment of the determination.

In the illustrated second embodiment, the determination to actually perform the shifting action of the automatic transmission portion 20 is made irrespective of the determination according to the nominal shifting boundary lines of FIG. 7, when the first electric motor operating point $P_{M1}$ has reached the shift-control start point $PM_{AT}$. However, the determination as to whether the automatic transmission portion 20 should be shifted need not be made according to the nominal shifting boundary lines of FIG. 7.

The reference point of the shift-control start point $PM_{AT}$ used in the illustrated second embodiment may be determined such that the amount of margin RM1 of the first electric motor operating point $P_{M1}$ indicated in FIG. 8 is determined to be equal to a predetermined value obtained by experimentation so as to prevent the output limitation of the first electric motor M1 at the steady-start or normal-state value of the working fluid temperature $TEMP_{ATF}$ after completion of the warm-up operation of the vehicle (automatic transmission portion 20).

In the illustrated power transmitting system 10, the differential portion 11 is operable as an electrically controlled continuously-variable transmission the speed ratio γ0 of which is variable from the minimum value γ0min to the maximum value γ0max, by controlling the operating state of the first electric motor M1. However, the speed ratio γ0 of the differential portion 11 may be variable in steps by utilizing its differential function.

While the engine 8 and the differential portion 11 in the illustrated power transmitting system 10 are connected directly to each other, the engine 8 may be operatively connected to the differential portion 11 through a coupling element such as a clutch.

In the illustrated power transmitting system 10, the first and second electric motors M1, M2 are respectively connected directly to the second and third rotary elements RE2, RE3, the first and second electric motors M1, M2 may be respectively connected to the second and third rotary elements RE2, RE3, through respective coupling elements such as clutches.

In the illustrated power transmitting system 10, the differential portion 11 is disposed between the engine 8 and the automatic transmission portion 20, the automatic transmission portion 20 may be disposed between the engine 8 and the differential portion 11. Namely, the automatic transmission portion 20 may be disposed at any position in the power transmitting path between the engine 8 and the drive wheels 38.

While the differential portion 11 and the automatic transmission portion 20 are connected in series with each other, these two portions need not be mechanically independent of each other, provided that the power transmitting system 10 as a whole as a function of an electrically controlled differential device the differential state of which is electrically controllable, and a function of a transmission operable to perform shifting actions in a manner different from that of the electrically controlled differential device.

While the power distributing mechanism 16 in the illustrated power transmitting system 10 is constituted by the single planetary gear set 24, the power distributing mechanism 16 may be constituted by two or more planetary gear sets.

In the illustrated power transmitting system 10, the engine 8 is operatively connected to the first rotary element RE1 of the planetary gear set 24 of the differential portion 11, and the first electric motor M1 is operatively connected to the second rotary element RE2, while the power transmitting path leading to the drive wheels 38 is connected to the third rotary element RE3. However, the principle of the present invention is equally applicable to a power transmitting system including a differential mechanism provided with two planetary gear sets having rotary elements some of which are connected to each other and to which the engine, electric motor and drive wheels are operatively connected, such that the differential mechanism is switchable between a step-variable shifting state and a continuously-variable shifting state by controlling clutches and brakes connected to the selected rotary elements.

While the automatic transmission portion 20 in the illustrated power transmitting system 10 is a transmission portion functioning as a step-variable automatic transmission, the automatic transmission portion 20 may be replaced by a continuously variable transmission portion (CVT).

In the illustrated power transmitting system 10, the second electric motor M2 is connected directly to the power transmitting member 18. However, the second electric motor M2 may be connected directly to a power transmitting path between the engine 8 or power transmitting member 18 and the drive wheels 38, or connected indirectly to this power transmitting path through a transmission, a planetary gear set or a coupling device.

In the power distributing mechanism 16 in the illustrated power transmitting system 10, the carrier CA0 is fixed to the engine 8, and the sun gear S0 is fixed to the first electric motor M1, while the ring gear R0 is fixed to the power transmitting member 18. However, this arrangement is not essential. The engine 8, first electric motor M1 and power transmitting member 18 may be fixed to any other elements selected from the three elements CA0, S0 and R0 of the planetary gear set 24.

While the engine 8 is directly fixed to the input shaft 14 in the illustrated power transmitting system 10, the engine 8 may be operatively connected to the input shaft 14 through any suitable member such as gears and a belt, and need not be disposed coaxially with the input shaft 14.

In the illustrated power transmitting system 10, the first electric motor M1 and the second electric motor M2 are disposed coaxially with the input shaft 14, and the first electric motor M1 is connected to the sun gear S0 of the differential portion 11 while the second electric motor M2 is connected to the power transmitting member 18. However, this arrangement is not essential. For instance, the first and second electric motors M1, M2 may be respectively connected to the sun gear S0 and the power transmitting member 18, through gears, belts or speed reducing devices.

In the illustrated power transmitting system 10, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

While the power distributing mechanism 16 in the illustrated power transmitting system 10 is constituted by one planetary gear set 24, it may be constituted by two or more planetary gear sets so that the power distributing mechanism 16 is operable as a transmission having three or more gear positions in the non-differential state (fixed-speed-ratio shifting state).

In the illustrated power transmitting system 10, the second electric motor M2 is connected to the power transmitting member 18 which constitutes a part of the power transmitting path between the engine 8 and the chive wheels 34. However, the second electric motor M2 which is connected to the above-indicated power transmitting path (power transmitting member 18) may be connectable to the power distributing mechanism 16 through a clutch or any other coupling device, so that the differential state of the power distributing mechanism 16 can be controlled by controlling the operating state of the second electric motor M2 rather than the first electric motor M1.

In the illustrated power transmitting system 10, the power distributing mechanism 16 is provided with the switching clutch C0 and the switching brake B0. However, the switching clutch C0 and brake B0 may be provided independently of the power distributing mechanism 16. Either one or both of the switching clutch C0 and brake B0 may be eliminated.

In the illustrated power transmitting system 10, the differential portion 11 is provided with the first and second electric motors M1, M2. However, the first and second electric motors M1, M2 may be provided in the power transmitting system 10, such that the motors M1, M2 are disposed outside or separately from the differential portion 11.

The illustrated first and second embodiments may be suitably combined together.

It is to be understood that the present invention may be embodied with other changes and improvement that may occur to those skilled in the art.

What is claimed is:

1. A control apparatus for a vehicular power transmitting system including (a) an electrically controlled differential portion having a differential mechanism disposed between an engine and a drive wheel of a vehicle, and a differential-portion electric motor operatively connected to the differential mechanism such that a differential state of the differential mechanism is controllable by controlling an operating state of the differential-portion electric motor, and (b) a transmission portion constituting a part of a power transmitting path, the control apparatus comprising:

a shift-control start-point changing portion configured to change a shift-control start point at which a determination to perform a shifting action of the transmission portion is made on a basis of an operating point of the differential-portion electric motor, such that the shift-control start point is changed according to a shifting response of the transmission portion; and a compulsory shift-control starting portion configured to make the determination to perform the shifting action, when the shift-control start-point changing portion determines that an operating point of the differential-portion electric motor has reached the shift-control start point, wherein:

in both cases of a shift-up action and a shift-down action of the transmission portion, the shift-control start-point changing portion changes the shift-control start point such that a moment of the determination to perform the shifting action of the transmission portion is advanced as the shifting response is reduced, and increases an amount of change of the shift-control start point with an increase of a running speed of the vehicle, wherein the amount of change of the shift-control start point is determined based on a predetermined chart that shows a relationship between the running speed of the vehicle and the amount of change of the shift-control start point.

2. The control apparatus according to claim 1, wherein the shifting action of the transmission portion is performed by a hydraulic actuator device, and the shifting response is determined on the basis of a temperature of a working fluid used to operate the hydraulic actuator device.

3. The control apparatus according to claim 1, wherein the shift-control start-point changing portion shifts a shift-up speed of the vehicle at which a determination to perform the shift-up action of the transmission portion is made, such that the shift-up speed decreases with a decrease of the shifting response of the transmission portion.

4. The control apparatus according to claim 1, wherein the shift-control start-point changing portion shifts a shift-down speed of the vehicle at which a determination to perform the shift-down action of the transmission portion is made, such that the shift-down speed increases with a decrease of the shifting response of the transmission portion.

5. The control apparatus according to claim 1, wherein the shift-control start-point changing portion changes, as the shift-control start point, an operating speed of the differential-portion electric motor at which the determination to perform the shifting action of the transmission portion is made.

6. The control apparatus according to claim 1, further comprising a shift-action determining portion configured to determine that the shifting action of the transmission portion should take place, when an operating point indicative of an operating state of the vehicular power transmitting system has reached a shifting point.

7. The control apparatus according to claim 1, further comprising a control portion which stores data representative of an operable zone of the differential-portion electric motor obtained by experimentation while taking account of a maximum permissible output, thermal durability and mechanical durability of the differential-portion electric motor, and wherein the control portion controls the differential-portion electric motor such that the operating point of the differential-portion electric motor is operated within the operable zone and such that the operating point does not reach an operable limit which defines a periphery of the operable zone.

8. The control apparatus according to claim 7, wherein the operating point of the differential-portion electric motor is defined by an operating speed and an output torque of the differential-portion electric motor and indicates an operating state of the differential-portion electric motor.

9. The control apparatus according to claim 7, wherein the operable zone of the differential-portion electric motor is a range within which the operating point of the differential-portion electric motor is permitted to be moved.

10. The control apparatus according to claim 7, wherein the control portion controls a speed ratio and a differential state of the electrically controlled differential portion such that an operating point of the engine moves along a highest-fuel-economy curve determined to establish a desired operating state of the engine.

11. The control apparatus according to claim 1, wherein the engine, the electrically controlled differential portion, the transmission portion and the drive wheel are disposed in this order of description in a power transmitting path between the engine and the drive wheel.

12. The control apparatus according to claim 1, wherein the shift-control start-point changing portion changes the shift-control start point such that the moment of the determination to perform the shifting action of the transmission portion is advanced as a running speed of the vehicle is increased while the shifting response of the transmission portion is lower than a steady-state value after completion of a warm-up operation of the vehicle.

13. The control apparatus according to claim 1, wherein the differential mechanism is a planetary gear set of a single-pinion type having a first rotary element in the form of a carrier connected to the engine, a second rotary element in the form of a sun gear operatively connected to the differential-portion electric motor, and a third rotary element in the form of a ring gear operatively connected to the drive wheel.

* * * * *